United States Patent
Streuer et al.

(12) 
(10) Patent No.: US 6,443,668 B1
(45) Date of Patent: Sep. 3, 2002

(54) ELEMENT COMPRISED OF A PLURALITY OF STRIPS RUNNING IN A HORIZONTAL AND VERTICAL MANNER, AND A METHOD FOR PRODUCING ELEMENTS BY CONNECTING CLOSED RINGS

(75) Inventors: Renate Streuer, Hildesheimer Strasse 252, D-30519 Hannover (DE); Gerd Weiland, Hannover (DE)

(73) Assignee: Renate Streuer, Hannover (DE)

( * ) Notice: Subject to any disclaimer, the term of this patent is extended or adjusted under 35 U.S.C. 154(b) by 0 days.

(21) Appl. No.: 09/582,211

(22) PCT Filed: Jan. 18, 1999

(86) PCT No.: PCT/DE99/00104

§ 371 (c)(1),
(2), (4) Date: Aug. 21, 2000

(87) PCT Pub. No.: WO99/36240

PCT Pub. Date: Jul. 22, 1999

(30) Foreign Application Priority Data

Jan. 19, 1998 (DE) .......................................... 198 01 694
May 25, 1998 (DE) .......................................... 198 23 244

(51) Int. Cl.[7] .............................. E02D 17/20; E02B 3/12
(52) U.S. Cl. ................................ 405/302.7; 405/302.6; 405/16; 405/19
(58) Field of Search .............................. 405/15, 16, 17, 405/19, 21, 25, 302.4, 302.6; 297/452.64, 452.63; 5/191

(56) References Cited

U.S. PATENT DOCUMENTS 3,719,962 A * 3/1973 Burkley ...................... 5/191
3,842,606 A    10/1974 Stiles et al.
4,150,909 A     4/1979 Hibarger et al. .............. 405/27
4,946,308 A *  8/1990 Chevalier ..................... 405/15
5,364,206 A * 11/1994 Marienfeld ................... 405/16
5,370,476 A * 12/1994 Streichenberger ............ 405/15
5,878,451 A *  3/1999 Lumine ................. 297/452.64

FOREIGN PATENT DOCUMENTS

| DE | 22 17 150 | 9/1975 |
| DE | 25 46 430 | 4/1977 |
| DE | 19 31 537 | 8/1978 |
| DE | 33 08 651 | 9/1984 |
| DE | 36 30 969 | 8/1989 |
| DE | G 94 10 292.9 | 2/1995 |
| WO | WO 99/12717 | 3/1999 |

* cited by examiner

Primary Examiner—Heather Shackelford
Assistant Examiner—Frederick L. Lagman
(74) Attorney, Agent, or Firm—Foley & Lardner

(57) ABSTRACT

The invention relates to an element (10) comprised of a plurality of strips (12 to 26) which run in a horizontal and vertical manner and which have common points of intersection. The strips (12 to 26) are respectively closed rings (28), whereby each ring (28) alternately encloses the rings (28) or is guided through the rings (28) which are arranged at a right angle thereto. A forward end (36) of each ring (28) is guided through a rear end (38) of each ring (28) arranged at a right angle thereto. The ring projects over the lateral edges (40) of the ring (28) arranged at a right angle thereto in such a way that an eye (42) and/or loop is formed in order to accommodate an additional element and/or a connection element (34).

15 Claims, 33 Drawing Sheets

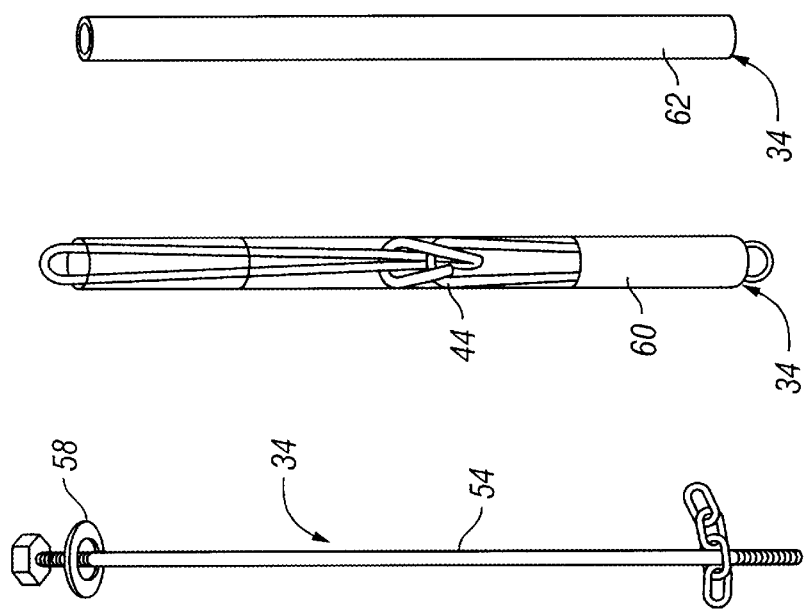
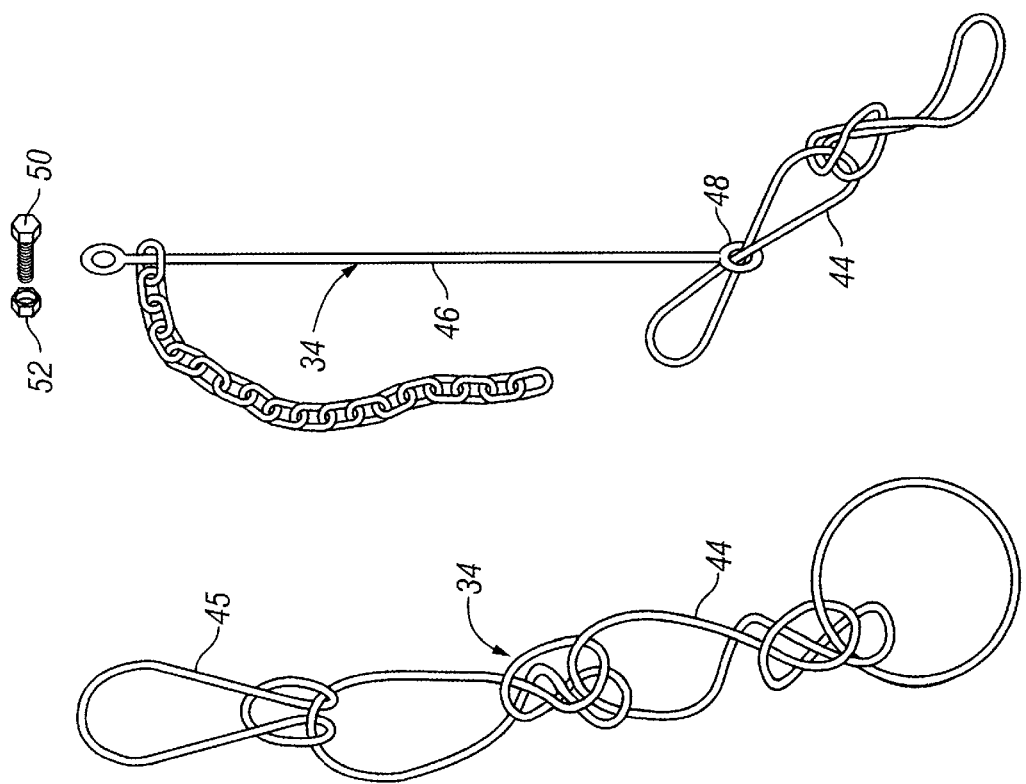

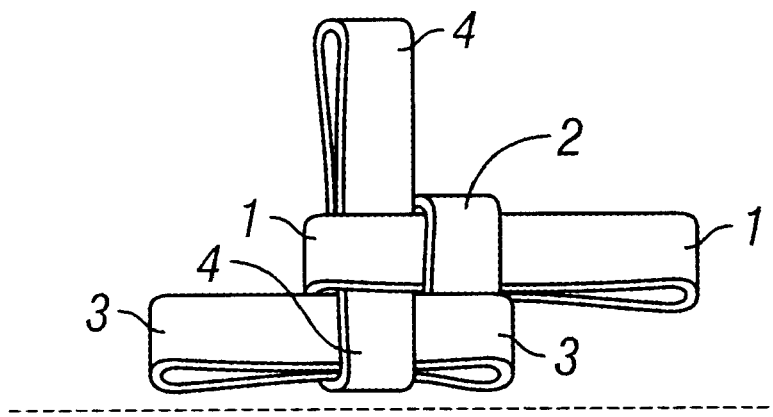
FIG. 23A
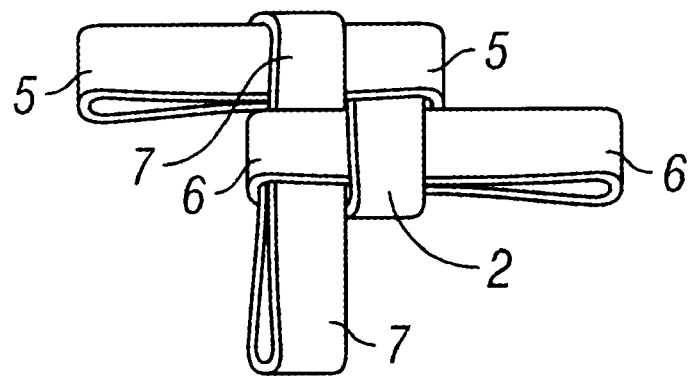
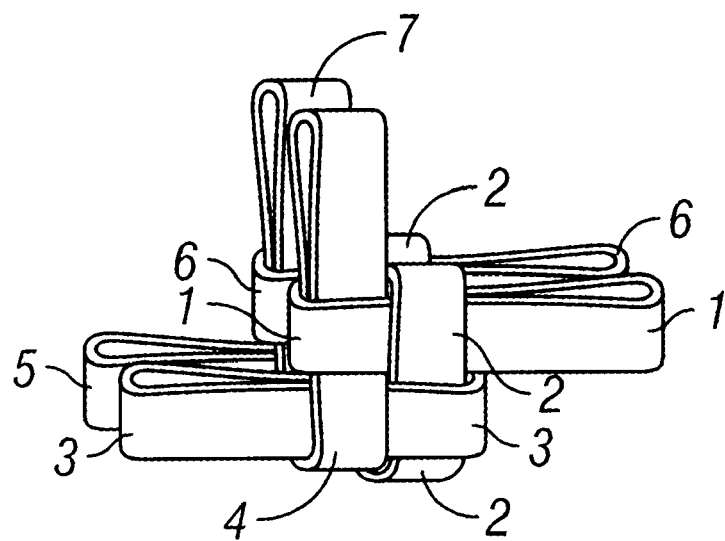
FIG. 23B

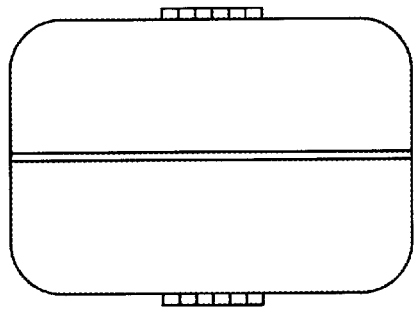
FIG. 29A
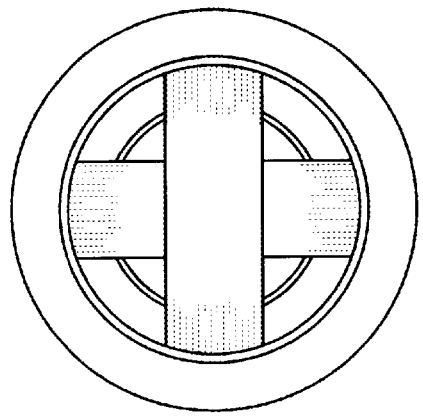
FIG. 29B
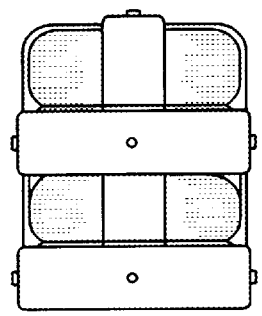
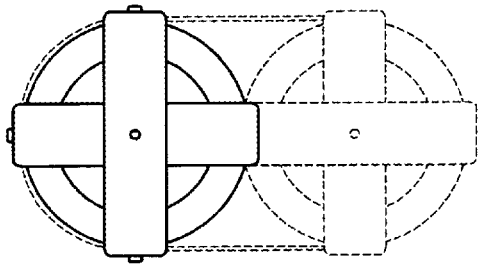
FIG. 30A

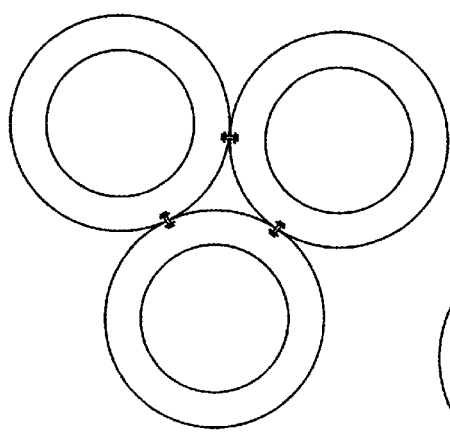
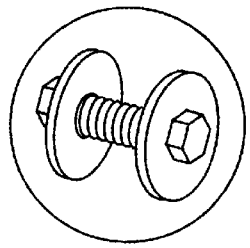
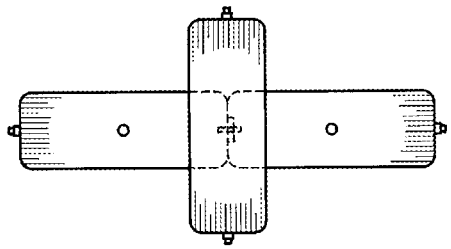
FIG. 31B
FIG. 31A
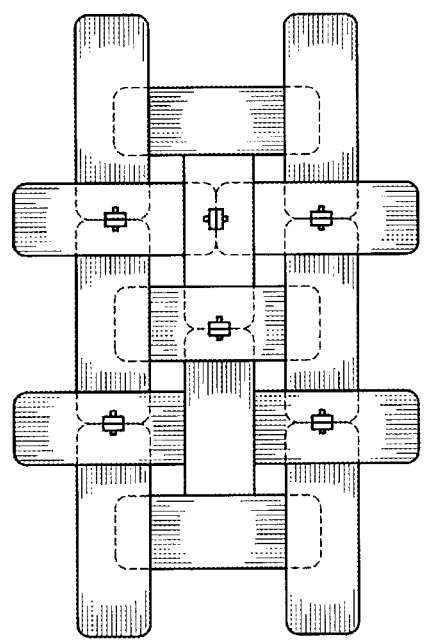
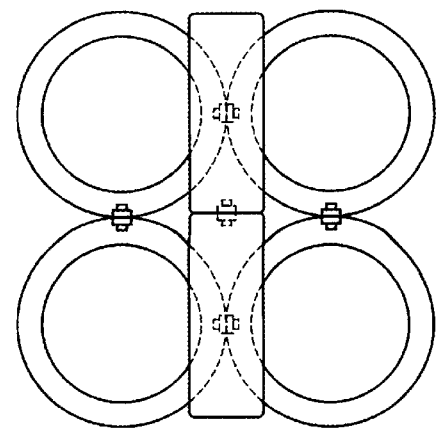
FIG. 32B
FIG. 32A
FIG. 32C

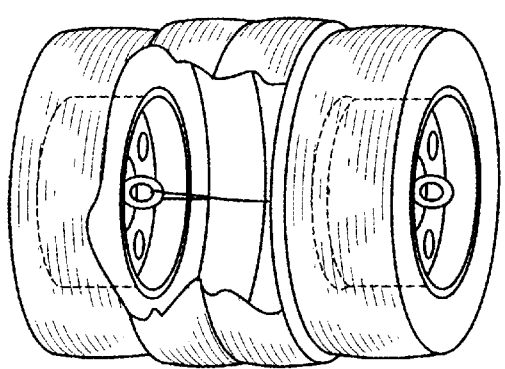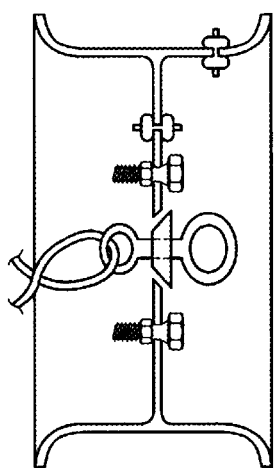
FIG. 45
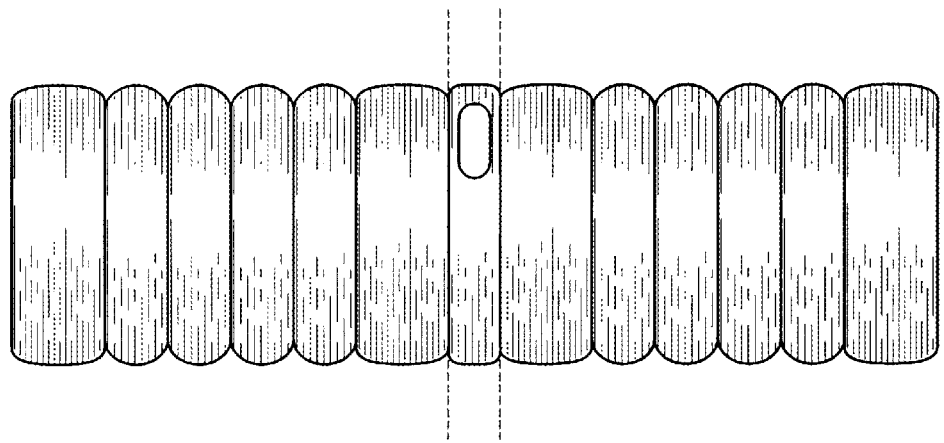
FIG. 46
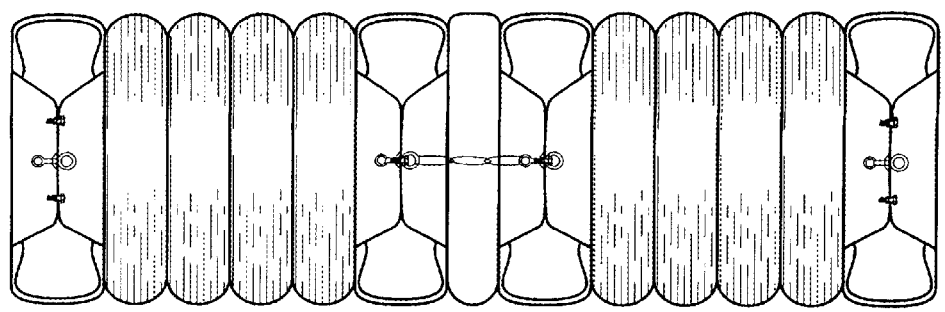
FIG. 47

ELEMENT COMPRISED OF A PLURALITY OF STRIPS RUNNING IN A HORIZONTAL AND VERTICAL MANNER, AND A METHOD FOR PRODUCING ELEMENTS BY CONNECTING CLOSED RINGS

BACKGROUND OF THE INVESTIGATION

1. Field of the Invention

The invention relates to an element composed of a plurality of horizontally and vertically running strips which have common intersection points and to a method for the production of elements by the interlinking of closed rings.

2. Description of the Related Art

Elements of this kind, in which the warp threads and weft threads lie alternately on top and cross over one another in such a way that a highly stable fabric is formed, are generally known. Elements of this kind, which, for example, take the form of mats, consist of a multiplicity of materials and are used for various purposes. Thus, for example, it is known from German Utility Model G 94 10 292.9 to produce rubber mats from strips of the treads of used tires and to use these rubber mats for the stabilization of dikes and slopes, for dune consolidation and for building paths and cycle tracks. Although it must be acknowledged, in principle, that the recycling of used tires in particular is certainly welcome, since the use of used tires for appropriate purposes is in keeping with the present-day notion of environmental protection, nevertheless there are limits to the use of such mats obtained from used tires.

This is because the strength and stability of such simple mats composed of strips of treads of used tires is not sufficient for the intended uses in question, since, in particular, mats known from German Utility Model G 94 10 292.9 are complicated to produce and make it necessary to employ metallic cramps and the like. Moreover, in this case, when the treads of the used tires employed are cut up, their metal insert is laid bare, thus entailing the risk that this metal insert may corrode.

As regards utilizing and employing the material of used tires for securing slopes for flood protection, proposals have already been made, for example in DE-B 25 46 430, DE-A 33 08 651 A1 and the already mentioned German Utility Model G 94 10 292.9. The use of woven mats or mat-like structures not consisting of used-tire recycling products for the stabilization of earth masses at risk of slipping and for soil or bank consolidation has likewise already been proposed, for example in DE 36 30 969 C2, DE-B 22 17 150 and DE-B 19 31 537.

These and similar mat-like structures have in common the disadvantage that they possess only limited flexibility, can be connected to further mats only to a limited extent and at considerable outlay, are available, when required, only to a limited extent and, when being laid on site, cannot be produced by hand. Moreover, it is possible for these known elements to be employed only to a restricted extent, since prefabricated elements can be adapted only in a limited way to land formations.

SUMMARY OF THE INVENTION

The object of the invention is to provide an element of the type initially mentioned, which can be produced easily and is cost-effective and which, for building purposes, is to have sufficient mechanical stability, sufficiently high flexibility and good damping properties in relation to mechanical stresses and is to be capable of being connected to further elements quickly and simply.

This object is achieved by means of an element of the type initially mentioned which has the features of patent claim 1.

The element is distinguished, according to the invention, in that the strips are in each case closed rings, in each case a ring alternately surrounding the rings arranged at right angles to it or being led through these rings, in each case a front end of a ring being led in each case through a rear end of a ring arranged at right angles to it.

The essence of the invention is an entirely novel type of connection of strips arranged at right angles to one another and having common intersection points, said type of connection deliberately avoiding types of linking or binding which have been known hitherto.

The subsequently published DE-A 197 40 413 A1, which is part of WO 99/12717 A, describes a method and an apparatus for the processing of tires, in which tire strips are interlaced to form coarse-mesh sheet-like structures and bodies. The sheet-like structures are interlaced in one piece. In contrast to this, there is provision, in the invention, for forming elements with a square base area, which have eyes, with the result that the square basic elements can be joined to one another.

According to the invention, it is possible, in a surprisingly simple way, to provide a mat-like element which, in contrast to conventional solutions, consists of closed rings which are interlaced in a novel way such that rings arranged at right angles to one another alternately surround one another or are encased by the rings arranged at right angles to one another.

By virtue of this novel technique, the rings take the form of flat elongate rings with a wavy shape and the element obtained by means of these rings is the form of a closed body with a square base area, said body being capable of being connected to further identical elements in the simplest possible way through the eyes by connection means. Although elements are also known which are composed of simple strips and of which the strip ends projecting beyond the composite strip structure are stitched around and thereby form eyes, these bodies, also woven from the treads of used tires, do not have sufficient mechanical strength and, in terms of mechanical pressure, only a low damping property which is not sufficient for all the intended uses.

Advantageously, one end projects beyond the side edge of a ring arranged at right angles to it, in such a way that an eye and/or strap for mounting a further element and/or connection means is obtained.

The elements can be combined with and connected to one another in any desired way according to the respective requirements. All forms are produced preferably from square basic elements which can be joined together with the aid of connecting elements. The basic element consists of rings running horizontally and vertically to one another and pressed flat together. Preferably the treads of used tires are used as rings.

The interlinking of closed rings makes it possible to produce "fabrics" or textiles, preferably geotextiles, of any desired size, in any desired shape and by means of various types of interlinking and therefore also with various properties, connecting elements not necessarily being required. The "fabrics" can be employed in all sectors where robust, load-bearing and weather-resistant geotextiles are required.

Not only rings pressed together, but also rings bent in a U-shaped manner can be used for interlinking. Multi-walled basic compact elements with different contours can be produced from these. These elements form a modular system, by means of which structural elements of any desired size and in a variety of shapes can be formed. Furthermore, from the basic compact elements, flexible load-bearing bands and rings, and also hollow bodies, can be produced, which can be employed in many industrial sectors.

In an advantageous refinement of the invention, there is provision for the rings to consist in each case of elastic material, in particular for them to consist of the tread of a vehicle tire. This makes it possible, in a surprisingly simple way, to provide an element which employs the predominant part of used tires which accumulate and which could otherwise be further utilized only with great difficulty.

In order to provide an element according to the invention, using treads of vehicle tires, eight used tires are usually required, the number of these being predetermined by the length/width ratio of the treads. When the treads, of, for example, special tires are used, a different number of tread rings may be chosen. Preferably, however, normal used tires with a customary diameter of 13 to 15 inches are employed.

An advantage of this refinement is, in particular, that these treads already possess mechanical properties which can be utilized in an advantageous way. The material and mechanical properties of the treads of automobile tires allow a very high degree of damping against impact loads, and they also afford protection against very high mechanical stresses, which is made possible, in particular, by the steel inserts in the tread, while, in the element according to the invention, these steel inserts cannot corrode since the tread rings are not severed.

The properties of treads of motor vehicle tires, in conjunction with the novel connection technique of the element according to the invention, can be utilized for a large number of areas of application. Mention may be made here, in particular, of flood protection, dike securing and dike renovation, which will be dealt with in more detail in the description.

In a practical refinement of the invention, the connection means capable of being led through the eyes of the element are rods, chains, ropes, tubes or the like. The element can also be connected to further elements in the simplest possible way by these connection means. In order, for example, to connect two elements to one another, it is necessary merely to butt the two elements against one another and lead a connection means through the eyes of the two elements, as a result of which the connection of two elements butting against one another is already made. As a result, a multiplicity of elements according to the invention can be connected to one another, to form large-area mats or canopies, and/or to other bodies which may likewise be formed from the elements according to the invention.

Mats or canopies assembled in this way can be employed, for example, as a foundation in road building, as a carrying sling for large loads, as a noise-damping railroad rail bed or for securing garbage dumps against slipping. It is also conceivable to use a mat consisting of a multiplicity of elements as a sight screen which can be planted with greenery easily and simply by means of pocket-like cavities between the rings of the elements.

In an advantageous refinement of the invention, the element is capable of being connected to five further identical elements to form a cube. A cube of this kind, which can be produced in the simplest possible way by the connection means led through the eyes of the individual elements, can be employed for a multiplicity of intended uses. For example, with a cube of this type, it is possible to produce quickly and simply a rampart for flood protection purposes, a noise protection wall, an impact protection barrier or the like.

In this case, in an advantageous refinement, there may be provision for a bag fillable with water, with air or with solid material to be capable of being introduced into the cube. A bag of this type can increase even further the inherent stability of the cube produced from the elements according to the invention. Moreover, with a bag of this type, the cavity of the cube can be utilized in a positive way, specifically in that it can be tared in a controlled way, depending on the filling material, that is to say it can thereby be designed to float, to be suspended in water or to sink. For example, floating platforms or emergency footbridges can be produced by means of air-filled cubes.

According to a practical refinement of the invention, the element may also be connectable to two further identical elements to form an open regular prism in the shape of a triangle. This gives rise to a tent-like structure, such as may be desirable for specific applications and which can be connected to further elements.

In a further advantageous refinement of the invention, there is provision for the element to be connectable to a claw tie. A claw tie of this type can be employed when a multiplicity of elements according to the invention are to be used for flood protection purposes. The claw tie can have a baseplate, the outer dimensions of which correspond to the dimensions of the element and which can therefore easily be integrated, for example, into a mat-like or canopy-like composite structure. So that the claw tie can be connected to at least one element simply and quickly, the claw tie can have, at its outer edges, eyes by means of which quick and simple hinge-like connection to at least one element is possible, in a similar way to the connection of at least two elements to one another.

According to a method for the production of an element, there is provision, in the case of a number of motor vehicle tires corresponding to the number of rings of the element, for detaching their side walls and rubber-encased rim rings, and for the remaining tread rings to be connected to form an element, in each case a tread ring alternately surrounding the tread rings arranged at right angles to it or being led through these tread rings, in each case a front end of a tread ring being led in each case through a rear end of a tread ring arranged at right angles to it and projecting beyond the side edge of this tread ring arranged at right angles to it, in such a way that an eye for mounting connection means is obtained.

In this method, above all, used tires are subjected in a positive way to further utilization which goes well beyond the normal period of utilization of a vehicle tire.

It must be emphasized, however, that the element according to the invention is not only to be produced from the treads of used tires, but all conceivable closed rings may be employed for this purpose, for example those composed of geotextiles, of plastic films and plastic casks, of sheet-metal rings and the like.

BRIEF DESCRIPTION OF THE DRAWINGS

Further advantages and refinements of the invention are described in more detail with reference to the following drawings which illustrate exemplary embodiments and in which:

FIGS. 4a–4e show connection means of the element according to the invention,

FIGS. 23a–b show a basic compact element with three double straps arranged at right angles to one another and the assembly sequence,
FIGS. 29a–b show a module A 3,
FIGS. 30a–c show a block formation from module A,
FIGS. 31a–b show a module B,
FIGS. 32a–c show a module B,
FIG. 45 shows an inner view of module D 3,
FIG. 46 shows a first variant of the block formation from module D 3,
FIG. 47 shows a first variant of the block formation from module D 3.

DETAILED DESCRIPTION OF THE PREFERRED EMBODIMENTS

Figure 1:
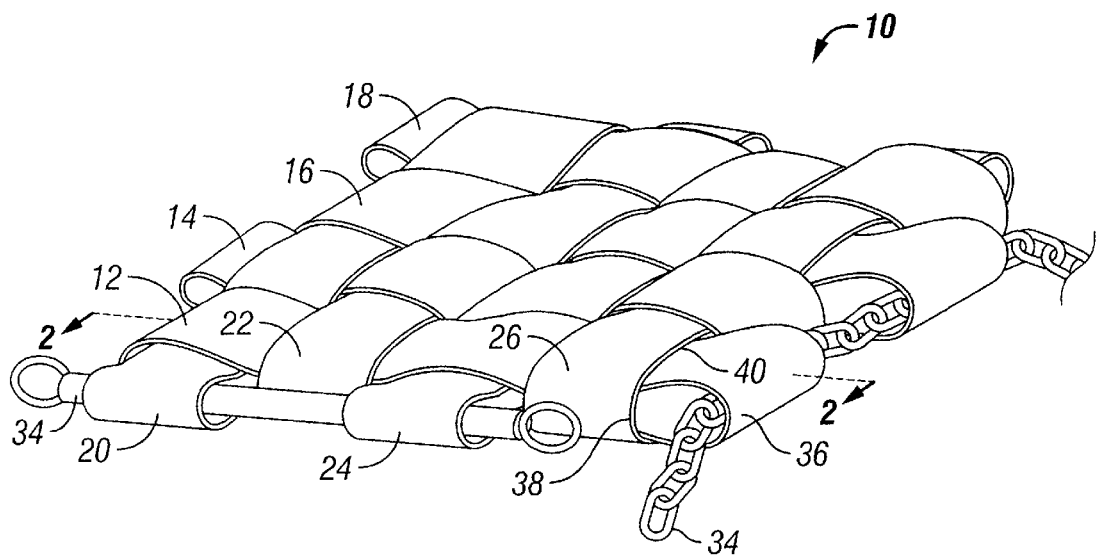
FIG. 1 shows an element according to the invention in a perspective illustration, FIG. 2. shows an element according to the invention in section along the line II–II' from FIG. 1.
Figure 2:
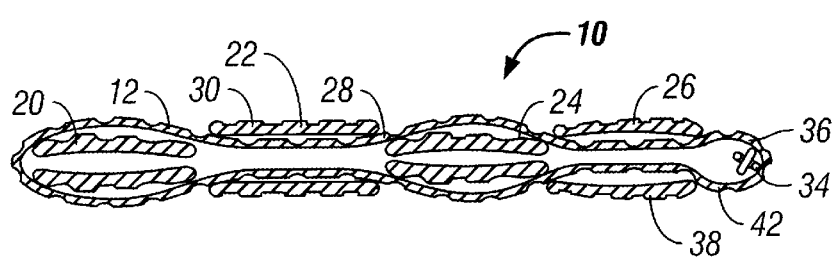
Figure 3:
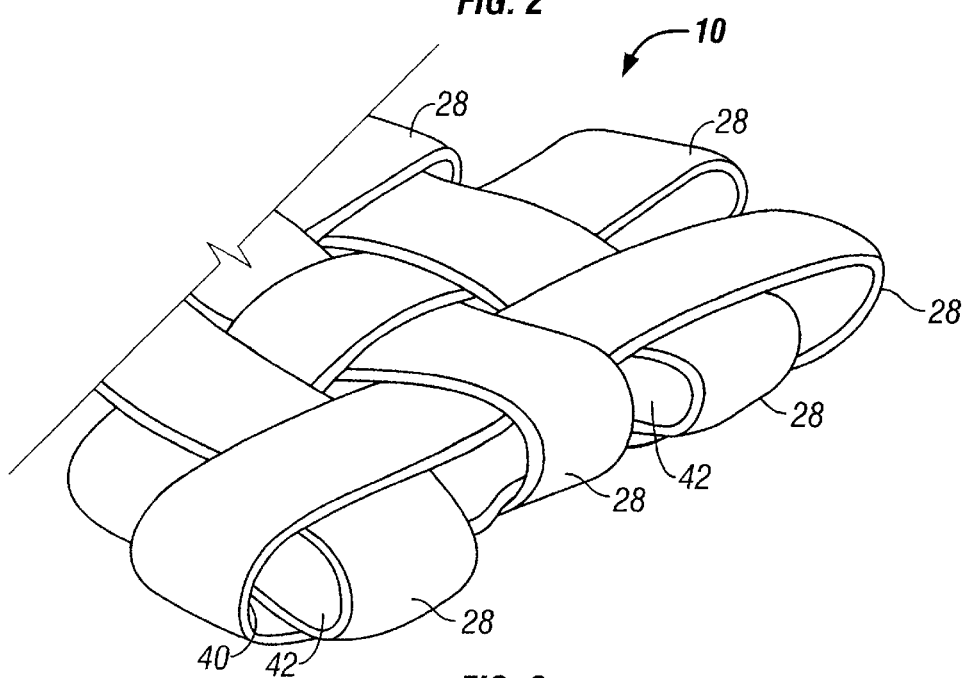
FIG. 3 shows a detail of the element according to the invention.

FIGS. 1 to 3 illustrate the basic makeup of an element 10 according to the invention. As may be gathered particularly from FIG. 1, this consists of a plurality of horizontally running rings 12, 14, 16, 18 pressed together and of a plurality of vertically running rings 20, 22, 24, 26 pressed together, that is to say, in each case, of an equal number of horizontal rings 12–18 and of vertical rings 20–26. Here, the rings 12–26 are in each case closed rings 28. Each ring 28 has emanated from the tread 30 of a broken-up automobile tire 32, and this will also have to be dealt with.

The element 10 illustrated in FIG. 1 is arrived at in the following way:

The vertical ring 20 is pushed from above through the horizontal ring 12. The vertical ring 22 is pushed over the horizontal ring 12 from the right. The vertical ring 24, in turn, is inserted from above through the horizontal ring 12, and the vertical ring 26 is then, like the vertical ring 22, pushed over the horizontal ring 12 from the right. The horizontal rings 14, 16, 18 are then also required to form the finished element 10. The horizontal ring 14 is then inserted through the vertical ring 20 from the left. Since the horizontal ring 14 then has to run above and below the vertical ring 22, it is recommended to draw the vertical ring 22 downward until it is then led upward again through the horizontal ring 14.

The horizontal ring 14 is then pushed further to the right through the vertical ring 24. In order then to bring the horizontal ring 14 over and under the vertical ring 26, a procedure similar to that of the vertical ring 22 must be adopted, that is to say the vertical ring 26 is to be drawn downward, the horizontal ring 14 is to be pushed to the right and then the vertical ring 26 is to be led upward again, but this time through the horizontal ring 14. The introduction of the horizontal ring 16 can then take place from the right, while the vertical ring 24 and the vertical ring 20 are to be pushed downward, in order thereafter to be pushed up again so as to be led through the horizontal ring 16. The introduction of the horizontal ring 18 takes place in a similar way to the horizontal ring 14. Finally, the element 10 can be fixed by means of connecting elements 34 and be connected to further elements 10 obtained in the same way.

An element 10 is thereby acquired, in which in each case a ring 28 alternately surrounds the rings 28 arranged at right angles to it or is surrounded by these rings 28. In each case a front end 36 of a ring 28 is led in each case through a rear end 38 of a ring 28 arranged at right angles to it and projects beyond the side edge 40 of this ring 28 arranged at right angles to it, in such a way that an eye 42 for mounting a connecting element 34 is obtained. This can be seen clearly, in particular, in the bottom right half of FIG. 1.

The element according to the invention is illustrated in FIG. 2 in section along the line II–II'.

FIG. 3 illustrates a detail of the element 10 according to the invention during the interlinking phase of the individual rings 28, and it can be seen in FIG. 3 that, during the interlinking phase, the individual rings 28 still surround one another loosely.

Examples of suitable connection means 34 for connecting an element according to the invention to a plurality of elements according to the invention or to other bodies are illustrated in FIGS. 4 to 4e. In FIG. 4a, the connecting element 34 is a chain 44 composed of a plurality of rim rings 45 which accumulate during the recycling of used tires which is employed in the invention. The connecting element 34 illustrated in FIG. 4b is a connecting rod 46 with lugs 48 which are integrally formed at its ends and through which further connecting elements 34 can be led, for example the chain 44 from FIG. 4a or a screw 50 with a nut 52. FIG. 4c illustrates a connecting element 34 which takes the form of a threaded rod 54 with a steel chain 56 and a retaining washer 58.

FIG. 4d illustrates the chain 44 from FIG. 4a, which serves as connecting element 34 and which is introduced into an assembly tube 60, with the aid of which the chain 44 can easily be led through eyes 42 of an element 10. In FIG. 4e, the connecting element 34 is a tube 62.

The connecting elements 34 illustrated in FIGS. 4a to 4e all serve to be led through the eyes 42 of elements 10, in order to connect an element 10 to further elements 10 or to tie an element 10 to the ground and soil.

Figure 5:
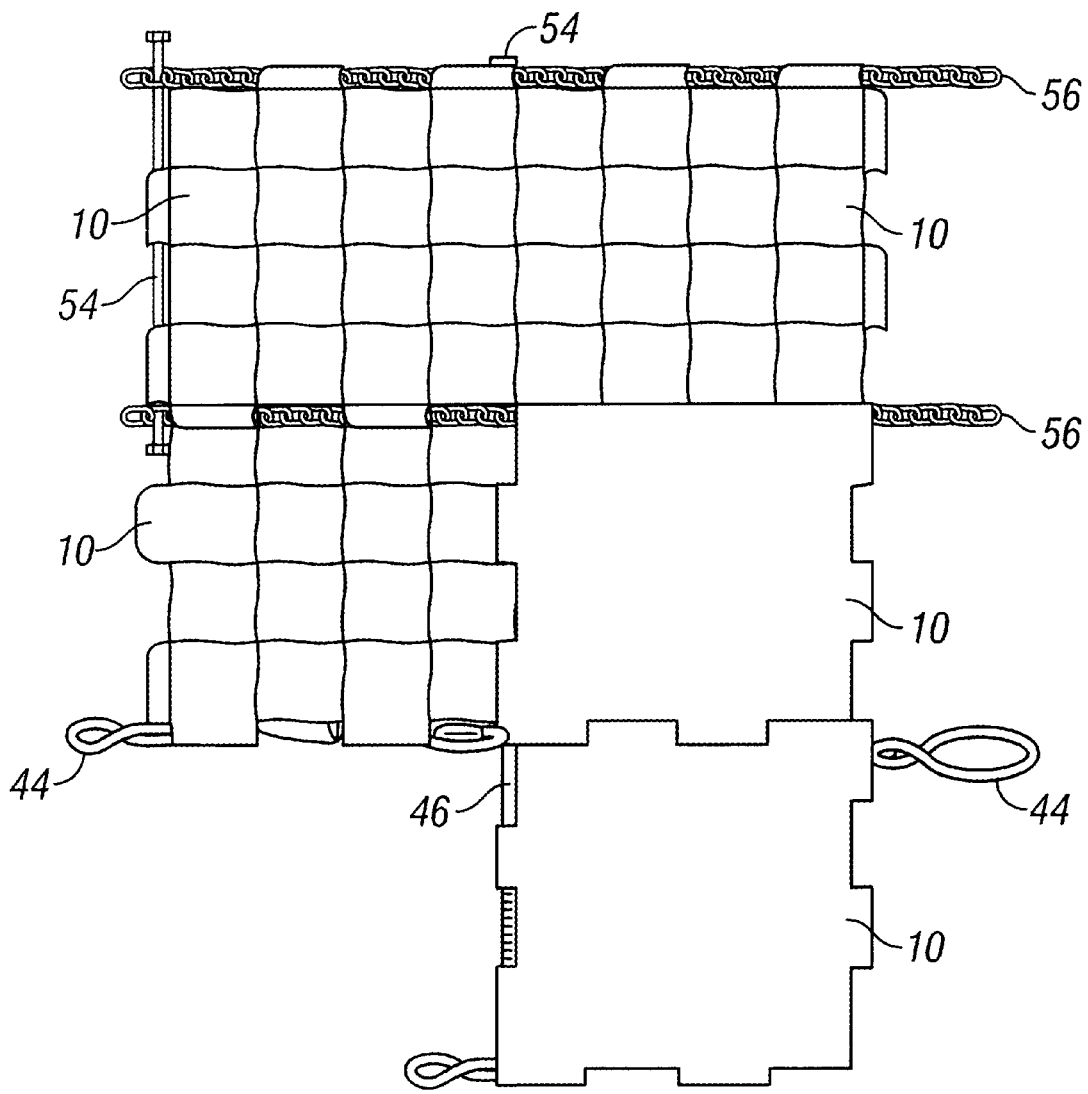
FIG. 5 shows a top view of an exemplary illustration of a plurality of elements according to the invention.

The possibility of connecting a plurality of elements 10 to one another is illustrated by way of example in FIG. 5. There, five elements 10 are connected to one another by means of threaded rods 54, by means of steel chains 56, by means of a connecting rod 46 and by means of chains 44 composed of rim rings 45. By connecting a multiplicity of elements 10 to one another, a mat of any desired size can be assembled, as the application requires.

Figure 6:
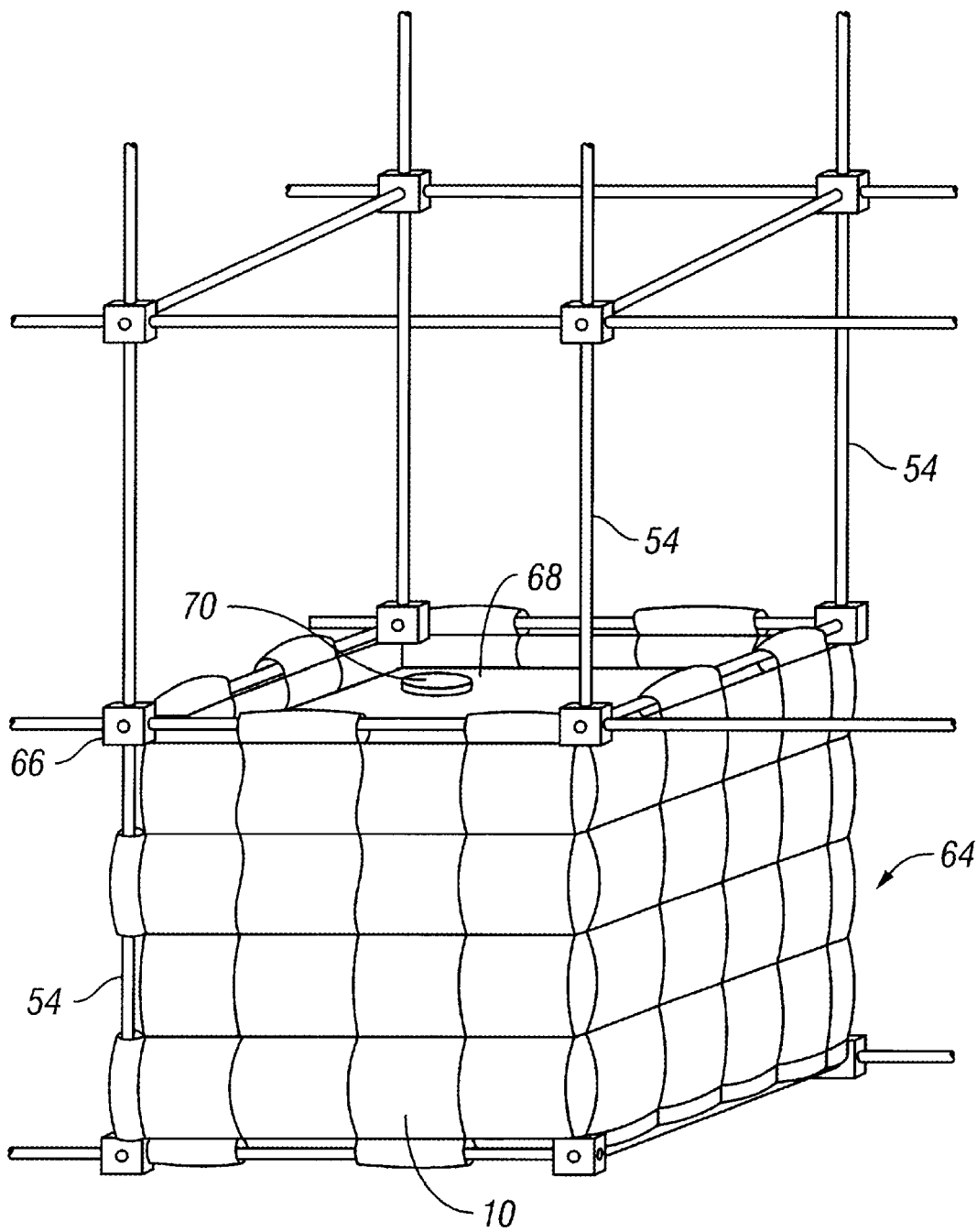
FIG. 6 shows a perspective illustration of the connection of a plurality of elements according to the invention to form an open cube.
Figure 7:
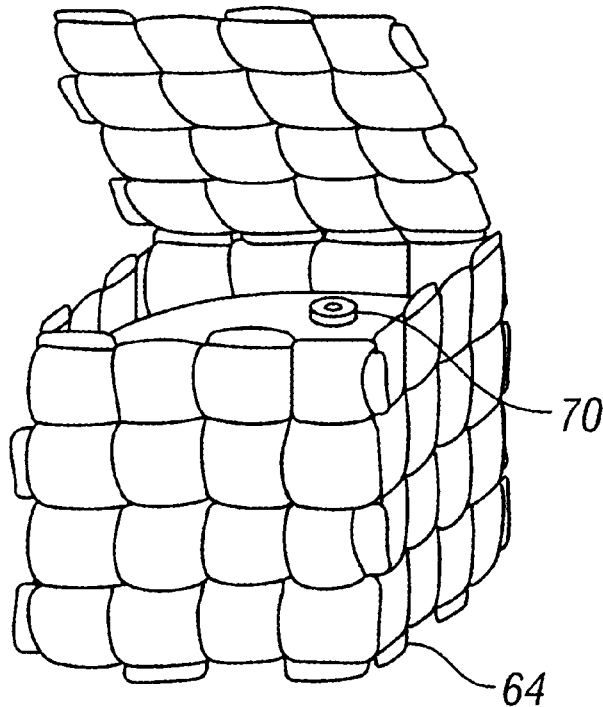
FIG. 7 shows a perspective illustration of a cube assembled from six elements according to the invention.
Figure 8:
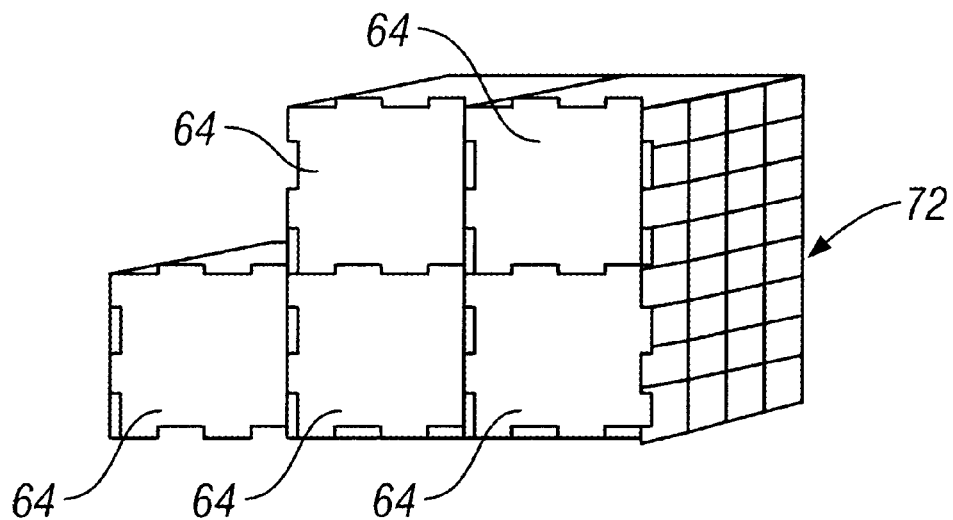
FIG. 8 shows a perspective illustration of a wall produced from five cubes from FIG. 7, FIGS. 9–11 show a claw tie connected to the element according to the invention, from the front, from the side and from below.

FIGS. 6 to 8 illustrate the combination of a plurality of elements 10 to form one or more cubes 64. The cube 64 illustrated in FIG. 6 is held together by means of rods 54, the rods 54 being inserted with their ends in insertion cubes 66. Although FIG. 6 illustrates an upwardly open cube 64, it is also possible, in the way illustrated in FIG. 6, to produce a cube closed on all sides, and, by means of the insertion cubes 66, the cube 64 can be connected to further cubes 64 or can serve as a base for a scaffold-like and flexible structure. As can also be seen in FIG. 6, the cavity 68 of the cube 64 is filled with a bag 70 which is capable of being filled up with air, water or a solid material, for example sand. This bag 70 serves for taring, stabilizing and weighting the cube 64.

FIG. 7 likewise illustrates a cube 64 which is likewise filled with a bag 70, the connection means used in the cube 64 from FIG. 7 not projecting beyond the side edges of the cube 64.

FIG. 8 illustrates diagrammatically the combination of five cubes 64 to form a rampart 72. A rampart, wall or the like can be put together and built up simply and quickly in the way described above by means of a multiplicity of cubes 64 assembled from elements 10 and connecting elements 34.

Figure 9:
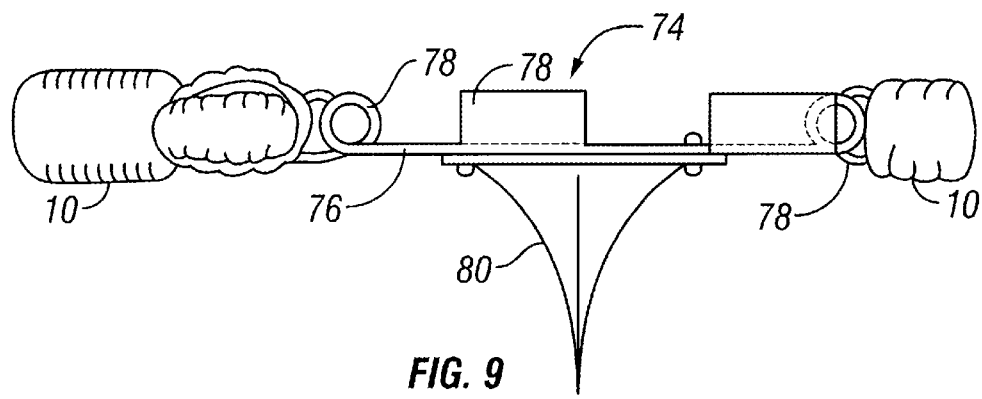
Figure 10:
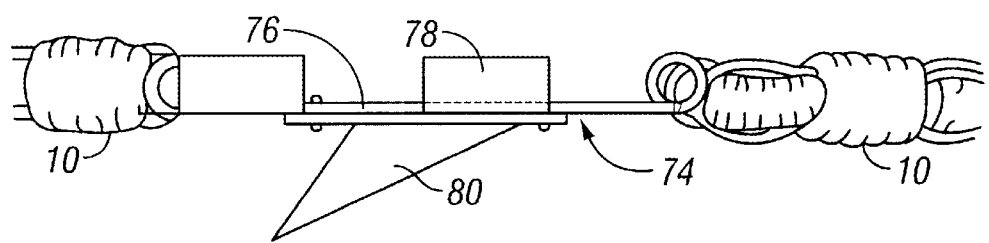
Figure 11:
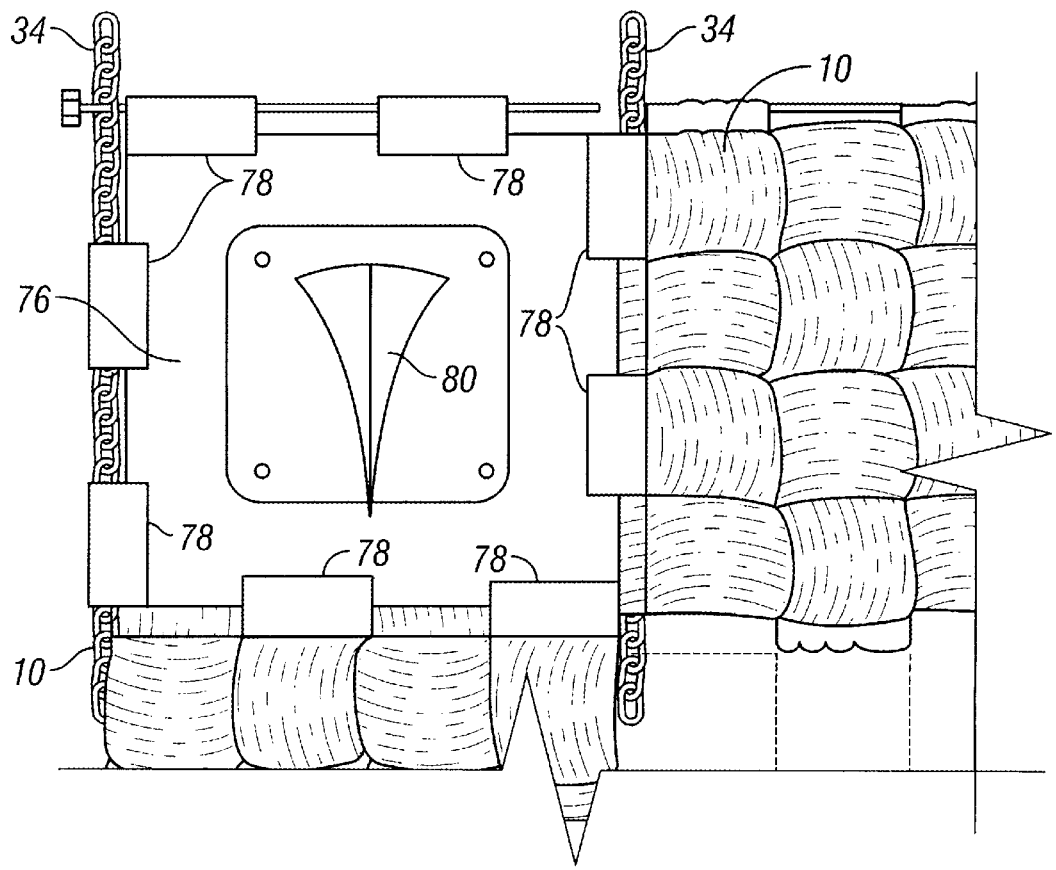

FIGS. 9 to 11 illustrate the connection of elements 10 to a claw tie 74. This claw tie 74 has a tie plate 76 with eyes 78 integrally formed laterally for connection to elements 10. To the underside of the tie plate 76 is fastened a tie hook 80 which serves for anchoring the elements 10 fastened to the claw tie 74 to the bottom of, for example, a dike, preferably a coastal dike. The eyes 78 serve for connecting the claw tie 74 to at least one element 10 by means of connecting elements 34, and these connecting elements 34 may correspond to the connection means 34 illustrated in FIGS. 4a to 4e.

Figure 12:
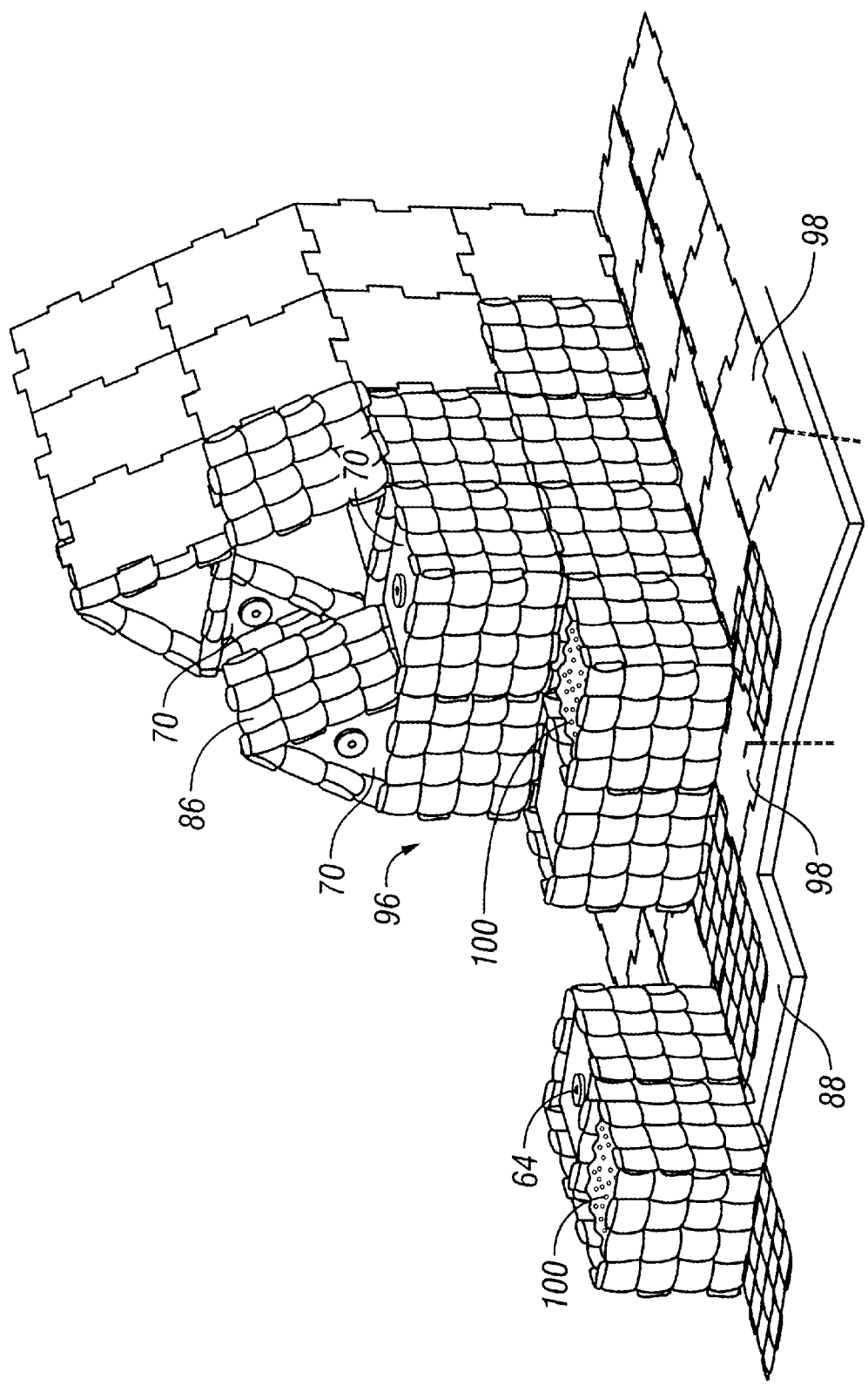
FIG. 12 shows the exemplary use of a multiplicity of elements according to the invention for increasing the height of a dike.
Figure 13:
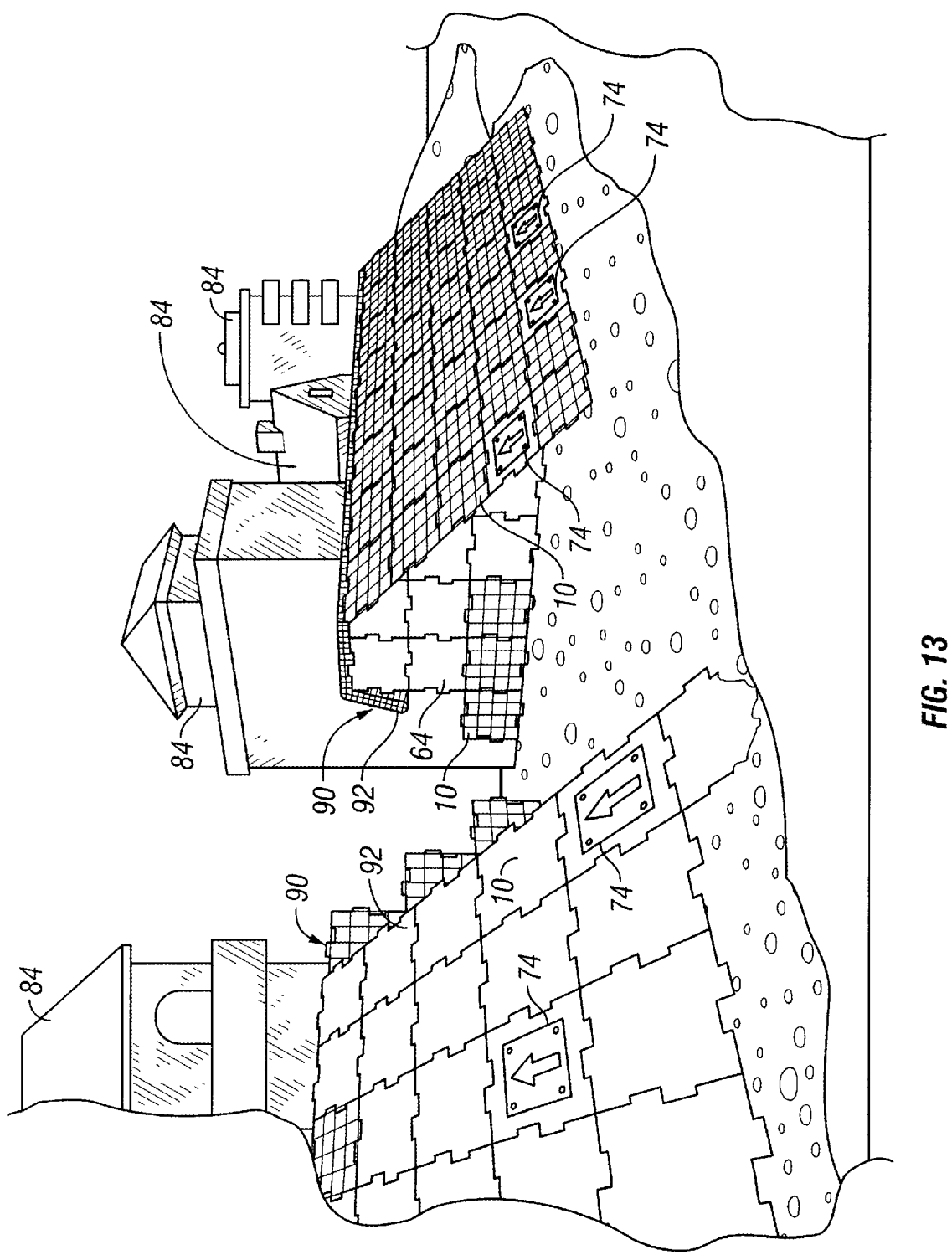
FIG. 13 shows the exemplary use of a multiplicity of elements according to the invention for laying out an emergency storm tide dike.

The use of elements 10 according to the invention for flood protection purposes is illustrated by way of example in FIGS. 12 and 13. FIG. 12 illustrates a river dike 82 which is at risk of high water and the height of which is increased by means of a dike top 96 formed from a multiplicity of elements 10. This dike top 96 consists of a mat 92 composed of a multiplicity of elements 10, of cubes 64 which are integrated into the mat 92 and are connected to the latter by connection means 34 and of triangles 86 which are connected to some of the cubes 64 and which form a tent-like or roof-like structure. The cubes 64 and triangles 86 are partially filled with sand 100 or with a bag 70, the bag being filled with a suitable material. For sealing off the river dike 82, a plastic canopy 88 is arranged between the river dike 82 and the mat 92. The mat 92 is connected to the river dike 82 by suitable means, for example by means of a fixing rod 98 indicated in FIG. 12.

The erection of an emergency dike 90 from a multiplicity of elements 10 in the shore region of a sea coast is illustrated by way of example in FIG. 13. Buildings 84 are to be protected by this emergency dike 90 against the high water and swell of, for example, a storm tide. As can be seen in FIG. 13, the basic body of the emergency dike 90 consists of a multiplicity of cubes 64 formed from elements 10, these cubes 64 being covered by a mat 92 composed of a multiplicity of elements 10. At the foot of the emergency dike 90, this mat 92 is anchored in the soil of the shore region by means of inserted claw ties 74.

An emergency dike 90 of this type, illustrated in FIG. 13, can, as required, be produced or erected quickly and simply on site.

It is also possible to secure already existing dikes or to increase the height of the dike top by means of elements 10 and cubes 64. Even when dikes are newly laid out, the elements 10 and cubes 64 can be employed in a useful way, for example a mat composed of a multiplicity of elements 10 can be inserted into the dike core. Cubes 64 may be arranged in the dike foreland, and these cubes 64 may also be filled up with rubble and similar earth materials. It was found, surprisingly, that, by means of such mats formed from elements 10 and by means of cubes 64 formed from elements 10, even an already existing dike structure can be reinforced considerably and secured against seepage, washover, soil failure and denudation.

Figure 14:
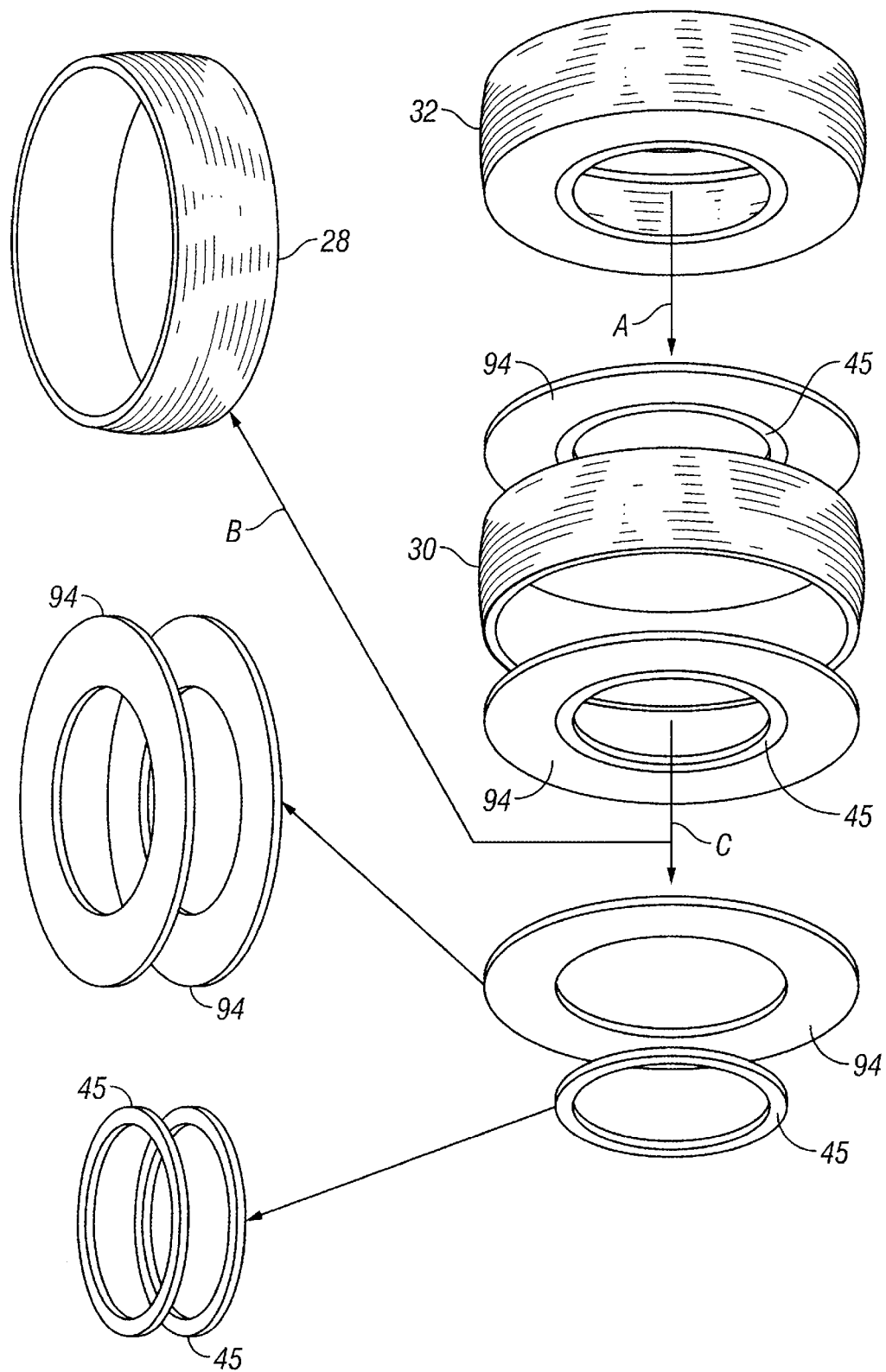
FIG. 14 shows diagrammatically the method steps for obtaining a ring of the element according to the invention from a used tire.

FIG. 14 illustrates diagrammatically a method for obtaining a ring 28 for the element 10 from a used tire 32. Starting from a worn automobile tire 32 with a tread 30, side walls 94 with rubber-encased rim rings 45 are detached in a first step, this being indicated by the arrow A. After the detachment of the side walls 94 has ended, the tread ring 28 is available and can then be processed further to form the element 10. This is indicated by the arrow B. The side walls 94 with rim rings 45 are separated from one another in a further step, this being illustrated by the arrow C, and the rim rings 45 can be processed further to form the chain 44 illustrated in FIG. 4a. Other recycling products, not illustrated in any more detail, can be produced by means of the side parts 94 which likewise accumulate.

The following statements describe further-developed variants of the interlinking technique in detail and classify the following systematic categories:

I. Method for the production of mats by ring interlinking
   A. Area-covering mat with rectilinear ring arrangement
   B. Area-covering mat with diagonal ring arrangement
   C. Holed mat with diagonal ring arrangement
II. Method for the production of basic compact elements by ring interlinking
   A. Basic compact element
   B. Basic compact element with a short double strap
   C. Basic compact element with a longer double strap
   D. Basic compact element with two double straps arranged at right angles to one another
   E. Basic compact element with two double straps opposite and offset to one another
   F. Basic compact element with three double straps arranged at right angles to one another
III. Product variants from the interlinking of basic compact elements

I. Method for the Production of Mats by Ring Interlinking

As a result of a further development of the interlinking technique, large-area mats can be produced in any desired dimensions. Mats of this kind are produced preferably from used tires. They can be employed inter alia as geotextiles, for example in the coastal protection sector.

A mat consists of rings which run horizontally and vertically to one another and are pressed flat together and which, when pressed together, have ideally a width/length ratio of 1:4. The rings are interlinked in such a way that they alternately surround or tunnel through one another and therefore have common intersection points. Interlacing may be carried out in various ways, so that three different designs may be obtained.

The production of the mats is described in detail below.

I.A. Area-covering Mat With Rectilinear Ring Arrangement

Figure 15A:
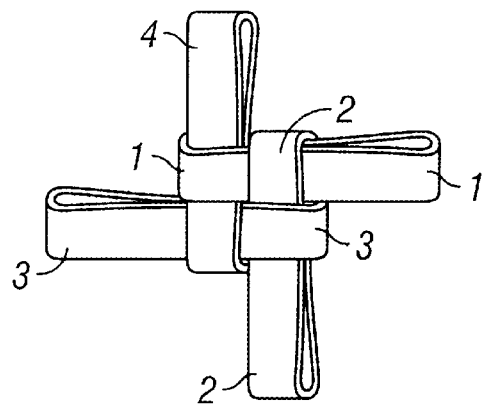
FIGS. 15a–c show an area-covering mat with a rectilinear ring arrangement
  a) the basic element
  b) continuation of the interlinking
  c) mat.

Four rings are initially required for the basic element (cf. FIG. 15a). These are interlinked as follows:

1. Ring 2 is arranged vertically.
2. Ring 1 is pushed horizontally through the upper region of ring 2, so that ¼ of the length of ring 1 projects from ring 2 on the left and ¾ of the length of ring 1 projects from ring 2 on the right.
3. Ring 3 is arranged laterally parallel to ring 1 directly below the latter. It surrounds ring 2 with its right end, so that ¾ of the length of ring 3 projects from ring 2 on the left. Ring 3 is therefore offset to the left by ¾ of its length in relation to ring 1.
4. Ring 4 is arranged laterally parallel to ring 2 and directly next to the latter on the left. It surrounds ring 3 with its lower end and is then led through the left end of ring 1. Ring 4 is therefore offset upward by ¾ of its length in relation to ring 2.

Figure 15B:
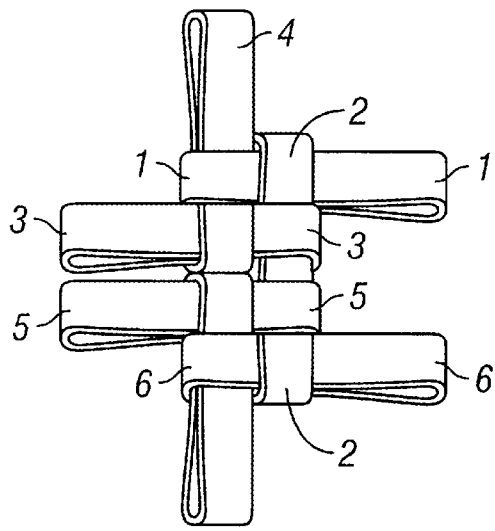

Interlinking is continued as follows, using three further rings (cf. FIG. 15b):

5. Ring 5 is arranged laterally parallel to ring 3 directly below the latter. It surrounds ring 2 with its right end, so that ¾ of the length of ring 5 projects from ring 2 on the left.
6. Ring 6 is arranged laterally parallel to ring 5 directly below the latter. It is led through the lower end of ring 2, so that ¼ of the length of ring 6 projects from ring 2 on the left and ¾ of the length of ring 6 projects from ring 2 on the right. Ring 6 is therefore offset to the right by ¾ of its length in relation to ring 5.
7. Ring 7 is arranged laterally parallel to ring 2 and directly next to the latter on the left. It surrounds ring 5 with its upper end and is then led through the left end of ring 6, so that ¾ of the length of ring 7 projects downward below ring 6.

Figure 15C:
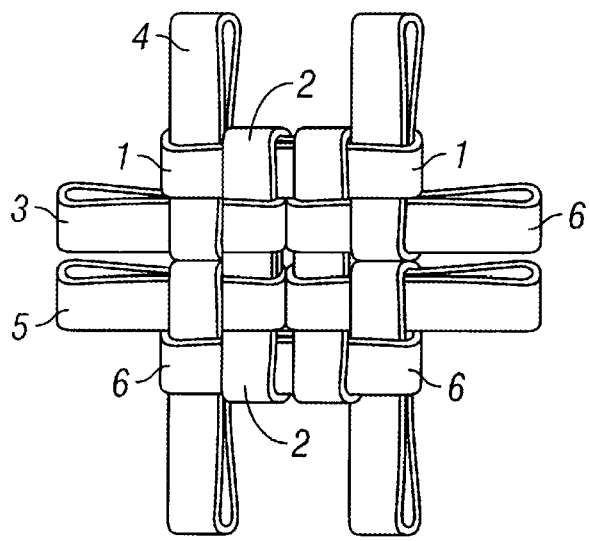

Interlinking may be continued according to the pattern described, so that a 4-wall mat (cf. FIG. 15c) of any desired size is obtained. This mat is distinguished in that it has high strength. It constitutes an area-covering "fabric".

I.B. Area-covering Mat With Diagonal Ring Arrangement

Figure 16A:
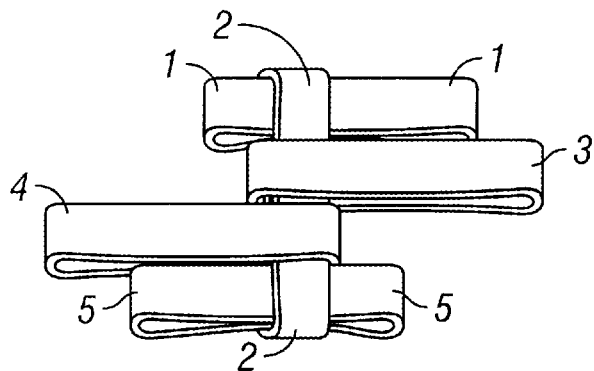
FIGS. 16a–c show an area-covering mat with a diagonal ring arrangement,
  a) the basic element,
  b) continuation of the interlinking,
  c) mat.

Five rings are initially required for the basic element (cf. FIG. 16a). These are interlinked as follows:

1. Ring 2 is arranged vertically.
2. Ring 1 is pushed horizontally through the upper region of ring 2, so that ¼ of the length of ring 1 projects from ring 2 on the left and ¾ of the length of ring 1 projects from ring 2 on the right.
3. Ring 3 is arranged laterally parallel to ring 1 directly below the latter. It surrounds ring 2 with its left end, so that ¾ of the length of ring 3 projects from ring 2 on the right. Ring 3 is therefore offset to the right by ¼ of its length in relation to ring 1.
4. Ring 4 is arranged laterally parallel to ring 3 directly below the latter. It surrounds ring 2 with its right end, so that ¾ of the length of ring 4 projects from ring 2 on the left. Ring 4 is therefore offset to the left by ¾ of its length in relation to ring 3.
5. Ring 5 is arranged laterally parallel to ring 4 directly below the latter. It is led through the lower end of ring 2, so that ¾ of the length of ring 5 projects from ring 2 on the left and ¼ of the length of ring 5 projects from ring 2 on the right. Ring 5 is therefore offset to the right by ¼ of its length in relation to ring 4.

Figure 16B:
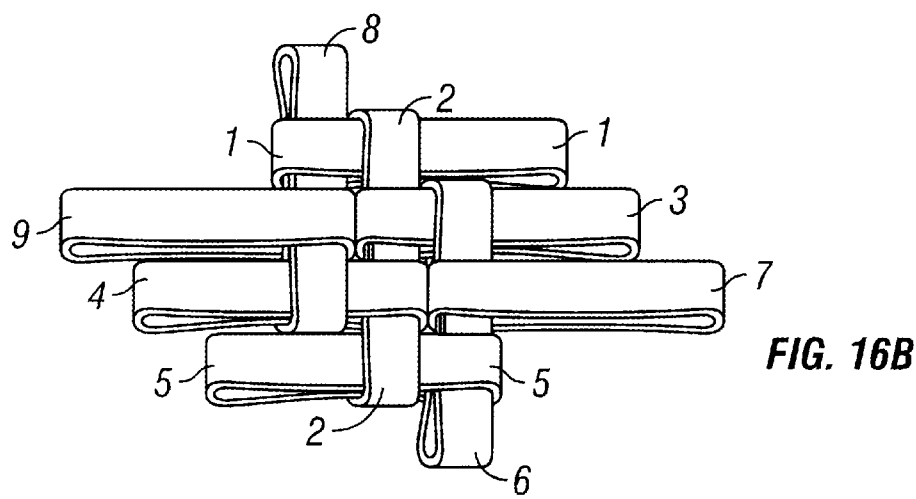

Interlinking is continued as follows, using four further rings (cf. FIG. 16b):

6. Ring 6 is arranged laterally parallel to ring 2, directly next to the latter on the right. It surrounds ring 3 with its upper end, so that ¾ of the length of ring 6 projects downward below ring 3. Ring 6 is therefore offset downward by ¼ of its length in relation to ring 2.
7. Ring 7 is arranged laterally parallel to ring 3 directly below the latter. It surrounds ring 6 with its left end, so that ¾ of the length of ring 7 projects from ring 6 on the right. Ring 7 is therefore offset to the right by ¼ of its length in relation to ring 3.
8. The downwardly pointing part of ring 6 is led through ring 5, so that ¼ of the length of ring 6 projects downward below ring 5.
9. Ring 8 is arranged laterally parallel to ring 2, directly next to the latter on the left. It surrounds ring 4 with its lower end, so that ¾ of the length of ring 8 projects upward above ring 4. Ring 8 is therefore offset upward by ¼ of its length in relation to ring 2.
10. Ring 9 is arranged laterally parallel to ring 4, directly above the latter. It surrounds ring 8 with its right end, so that ¾ of the length of ring 9 projects from ring 8 on the left. Ring 9 is therefore offset to the left by ¼ of its length in relation to ring 4.
11. The upwardly pointing part of ring 8 is led through ring 1, so that ¼ of the length of ring 8 projects above ring 1.

Figure 16C:
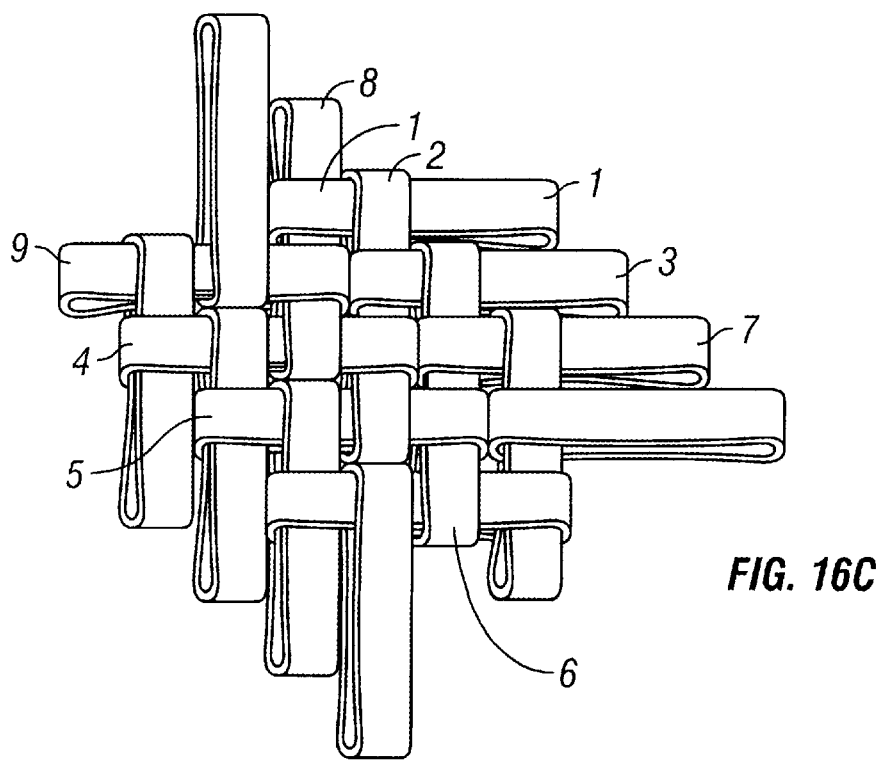

Interlinking can be continued according to the pattern described, so that a 4-wall mat (cf. FIG. 16c) of any desired size is obtained. This mat is distinguished in that it has high flexibility. It constitutes an area-covering "fabric".

I.C. Holed Mat With Diagonal Ring Arrangement

Figure 17A:
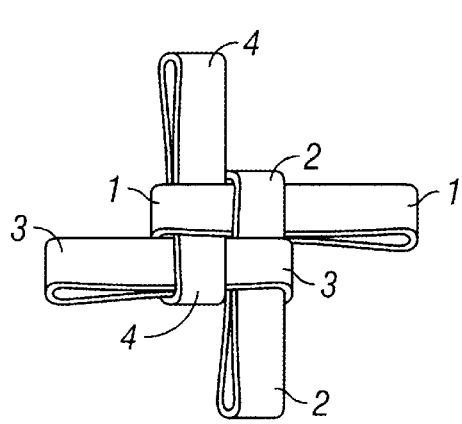
FIGS. 17a–c show a holed mat with a diagonal ring arrangement
  a) the basic element,
  b) continuation of the interlinking,
  c) mat.

Four rings are initially required for the basic element (cf. FIG. 17a). These are interlinked as follows:
1. Ring 2 is arranged vertically.
2. Ring 1 is led horizontally through the upper region of ring 2, so that ¼ of the length of ring 1 projects from ring 2 on the left and ¾ of the length of ring 1 projects from the latter on the right.
3. Ring 3 is arranged laterally parallel to ring 1 directly below the latter. It surrounds ring 2 with its right end, so that ¾ of the length of ring 3 projects from ring 2 on the left. Ring 3 is therefore offset to the left by ¾ of its length in relation to ring 1.
4. Ring 4 is arranged laterally parallel to ring 2, directly next to the latter on the left. It surrounds ring 3 with its lower end and is led through the left end of ring 1. Ring 4 is therefore offset upward by ¾ of its length in relation to ring 2.

Figure 17B:
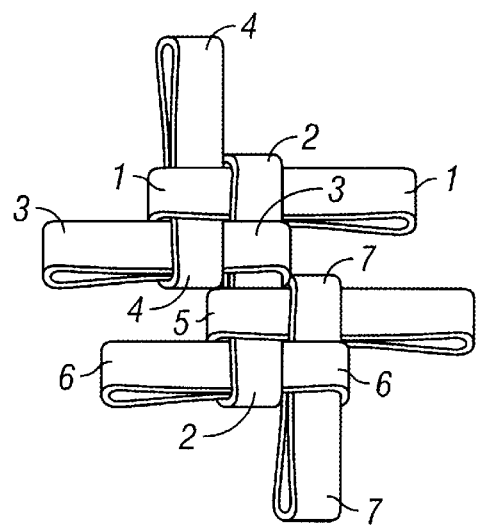

Interlinking is continued as follows, using three further rings (cf. FIG. 17b):
5. Ring 5 is arranged laterally parallel to ring 3 directly below the latter. It surrounds ring 2 with its left end. Ring 5 is therefore offset to the right by ¾ of its length in relation to ring 3.
6. Ring 6 is arranged laterally parallel to ring 5 directly below the latter. It is led through the lower end of ring 2, so that ¾ of the length of ring 6 projects from ring 2 on the left and ¼ of the length of ring 6 projects from ring 2 on the right. Ring 6 is therefore offset to the left by ¾ of its length in relation to ring 5.
7. Ring 7 is arranged laterally parallel to ring 2, directly next to the latter on the right. It surrounds ring 5 with its upper end and is led through the right end of ring 6, so that ¾ of the length of ring 7 projects downward below ring 6. Ring 7 is therefore offset downward by ¾ of its length in relation to ring 2.

Figure 17C:
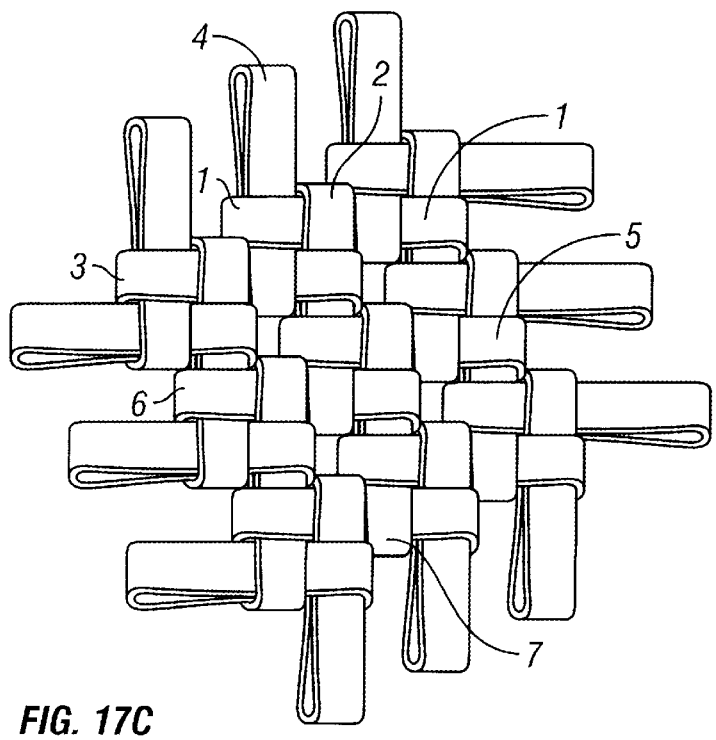

Interlinking can be continued according to the pattern described, so that a 4-wall mat (cf. FIG. 17c) of any desired size is obtained. This mat is distinguished in that it has a hole pattern. It has a degree of area coverage of 80%.

II. Method for the Production of Basic Compact Elements by Ring Interlinking

Variations in the above-described interlinking techniques result in compact 8-wall basic elements, from which a variety of compact shapes of any desired size, stretchable bands and rings and spatial structures can be manufactured, without further materials having to be used for this purpose.

A basic compact element consists of rings pressed flat together and of rings bent in a U-shaped manner. These ring forms are interlinked in such a way that they alternately surround or tunnel through one another. Interlinking may be carried out in various ways, so that different basic compact elements are obtained. They all have the same dimensions, but differ in the arrangement and number of projecting eyes or straps, thereby determining the possibilities for further interlinking.

The production of six different basic compact elements is described in detail below.

The interlinking alternatives outlined may be further varied, as required, for example in such a way that compact elements with a combination of short and long straps in a different arrangement are obtained. The types of interlinking of these variants can be derived from the method descriptions of the basic compact elements described here and therefore need no further explanation.

II.A. Basic Compact Element

Figure 18A:
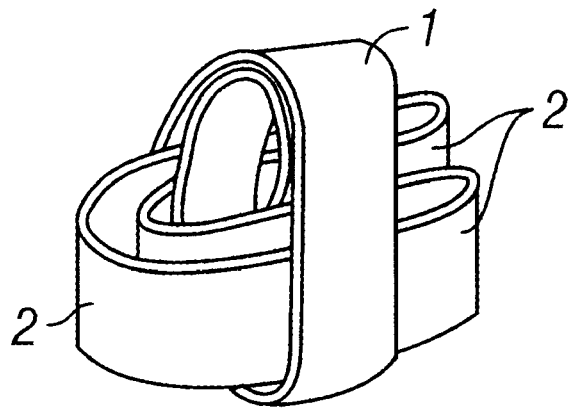
FIGS. 18a–c show a basic compact element and the assembly sequence.
Figure 18B:
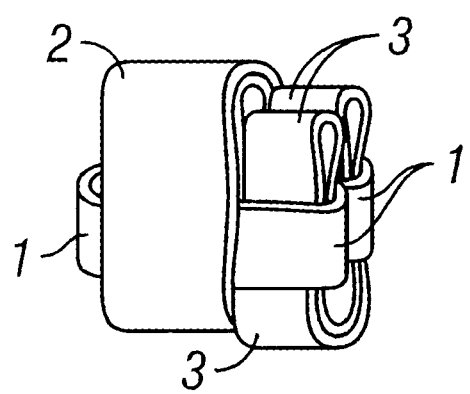

This element consists of four rings bent in a U-shaped manner. These are interlinked as follows:
1. U-ring 2 is arranged in such a way that the open ends of the U point downward.
2. U-ring 1 is arranged at right angles to this, so that the open ends of the U point to the right. In this case, the ends of U-ring 1 are led through the ends of U-ring 2, so that the ends of U-ring 1 project on the right and the bend of U-ring 2 projects upward (cf. FIG. 18a).
3. U-ring 3 is arranged laterally parallel to U-ring 2 and on the right of the latter, so that the open ends of the U point upward. In this case, the ends of U-ring 3 are led through the ends of U-ring 1, so that the ends of U-ring 3 project upward (cf. FIG. 18b).
4. U-ring 4 is arranged laterally parallel to U-ring 1 and above the latter, so that the open ends of the U point to the left. In this case, the ends of U-ring 4 are led first through the ends of U-ring 3 and then through the double wall of U-ring 2.

Figure 18C:
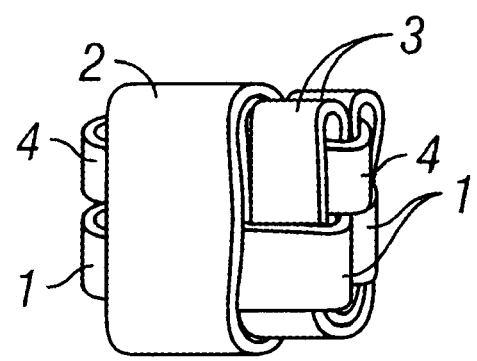

A wedge is led through the strap ends of U-ring 4 which project from U-ring 2 on the left, in order to fix the interlinking (cf. FIG. 18c).

II.B. Basic Compact Element With a Short Double Strap

Figure 19A:
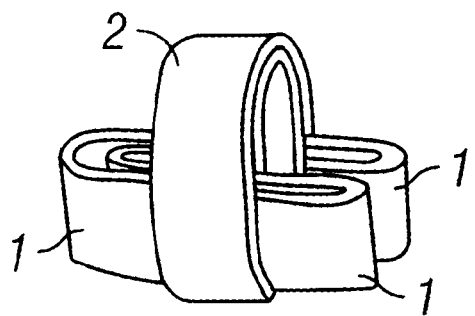
FIGS. 19a–c show a basic compact element with a short double strap and the assembly sequence.
Figure 19B:
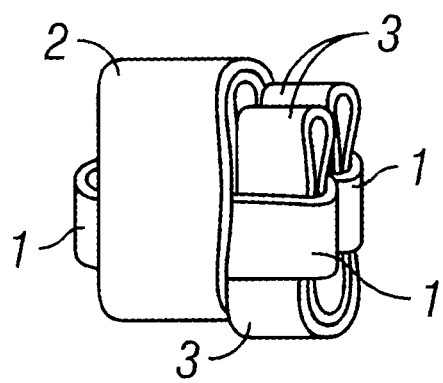
Figure 19C:
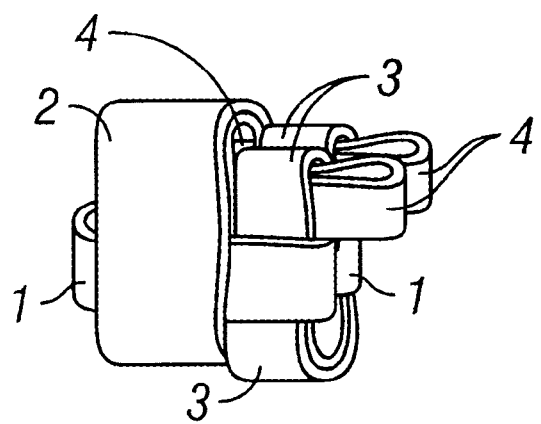

This element consists of four rings bent in a U-shaped manner. These are interlinked as follows:
1. U-ring 2 is arranged in such a way that the open ends of the U point downward.
2. U-ring 1 is arranged at right angles to this, so that the open ends of the U point to the right. In this case, the ends of U-ring 1 are led through the ends of U-ring 2, so that the ends of U-ring 1 project on the right and the bend of U-ring 2 projects upward (cf. FIG. 19a).
3. U-ring 3 is arranged laterally parallel to U-ring 2 and on the right of the latter, so that the open ends of the U point upward. In this case, the ends of U-ring 3 are led through the ends of U-ring 1, so that the ends of U-ring 3 project upward (cf. FIG. 19b).
4. U-ring 4 is arranged laterally parallel to U-ring 1 above the latter, so that the open ends of the U point to the right. In this case, the ends of U-ring 4 are led through the ends of U-ring 3, so that the ends of U-ring 4 project to the right (cf. FIG. 19c).

The straps or double strap (U-ring 4) thus obtained allow further interlinking of this compact element with identical or different compact elements and with other ring-interlinked elements.

II.C. Basic Compact Element With a Long Double Strap

Figure 20A:
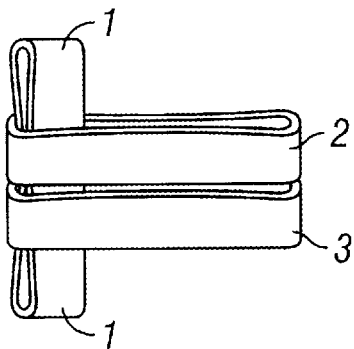
FIGS. 20a–e show a basic compact element with a long double strap and the assembly sequence.
Figure 20B:
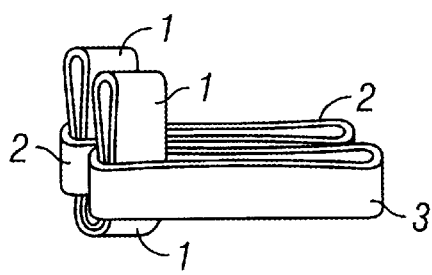
Figure 20C:
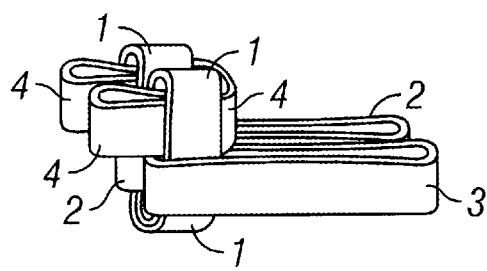

This element consists of five rings pressed together. These are interlinked as follows:
1. Ring 1 is arranged vertically.
2. Ring 2 is arranged horizontally. It surrounds ring 1 with its left end, so that ¾ of the length of ring 2 projects from ring 1 on the right and ¼ of the length of ring 1 projects above ring 2 and ¾ of the length of ring 1 projects below ring 2.
3. Ring 3 is arranged laterally parallel to ring 2 directly below the latter. It surrounds ring 1 with its left end, so that ¾ of the length of ring 3 projects from ring 1 on the right (cf. FIG. 20a).
4. The element is then folded together in such a way that ring 1 forms a U-shape, the U-legs being surrounded in each case by ring 2 and ring 3 in the lower region, so that the ends of ring 2 and ring 3 project to the right (cf. FIG. 20b).
5. A U-ring 4 is led from right to left through the upwardly projecting ends of U-ring 1, so that the ends of U-ring 4 project on the left (cf. FIG. 20c).

Figure 20D:
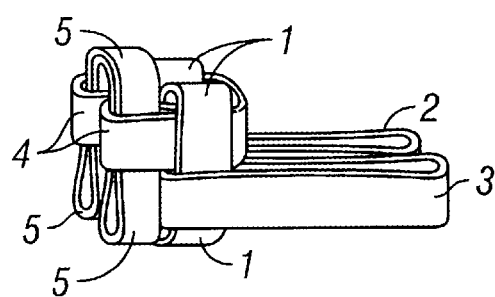
Figure 20E:
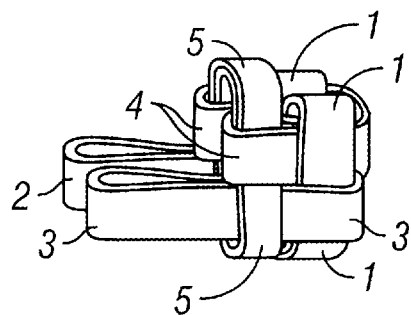

6. The ends of U-ring 5 are led through the ends of U-ring 4 from above, so that they project downward (cf. FIG. 20*d*).
7. Ring 2 and ring 3 are in each case led from right to left through the lower ends of U-ring 5, so that ¾ of the length of ring 2 and ring 3 projects to the left (cf. FIG. 20*e*).

The basic compact element obtained has two long straps or one long double strap (ring 2 and ring 3). This allows further interlinking with identical or different compact elements and with other ring-interlinked elements.

Figure 21A:
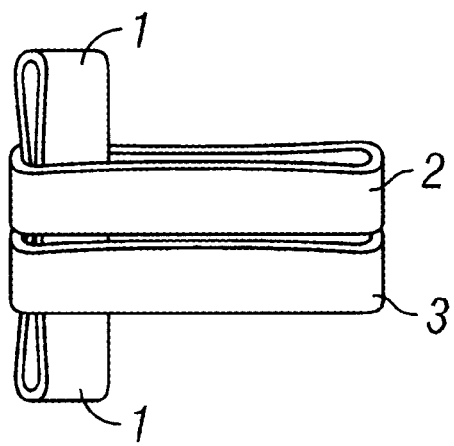
FIGS. 21a–d show a basic compact element with two double straps arranged at right angles to one another and the assembly sequence.
Figure 21B:
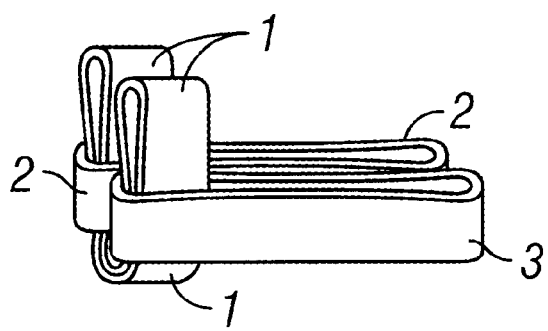
Figure 21C:
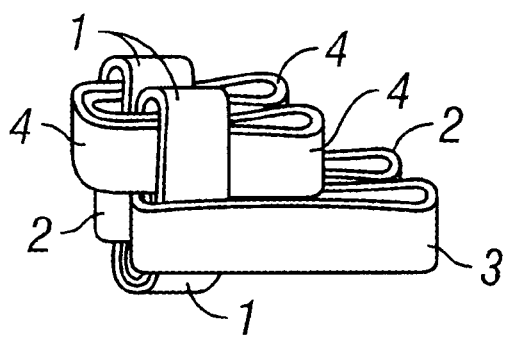
Figure 21D:
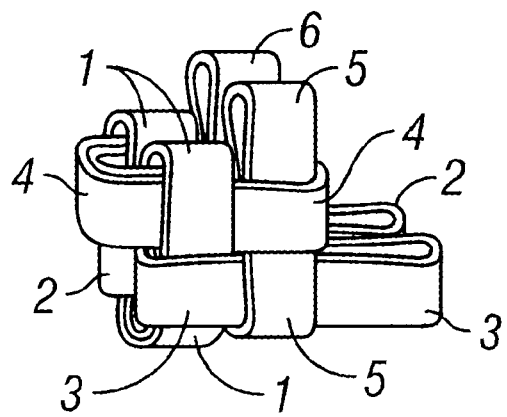

II.D. Basic Compact Element With Two Double Straps Arranged at Right Angles to One Another This element consists of six rings pressed together. These are interlinked as follows:
1. Ring 1 is arranged vertically.
2. Ring 2 is arranged horizontally. It surrounds ring 1 with its left end, so that ¾ of the length of ring 2 projects from ring 1 on the right, ¼ of the length of ring 1 projects above ring 2 and ¾ of the length of ring 1 projects below ring 2.
3. Ring 3 is arranged laterally parallel to ring 2 directly below the latter. It surrounds ring 1 with its left end, so that ¾ of the length of ring 3 projects from ring 1 on the right (cf. FIG. 21*a*).
4. The element is then folded together in such a way that ring 1 forms a U-shape, the U-legs being surrounded in each case by ring 2 and ring 3 in the lower region. The element is arranged in such a way that the ends of ring 2 and ring 3 project to the right (cf. FIG. 21*b*).
5. A U-ring 4 is led from left to right through the upwardly projecting ends of U-ring 1, so that the ends of U-ring 4 project to the right (cf. FIG. 21*c*).
6. Ring 5 and ring 6 are arranged parallel to the legs of U-ring 1, directly next to these on the right, they surround in each case ring 2 and ring 3 with their lower end and are then led through the ends of U-ring 4, so that their ends project upward by ⅔ of their length (cf. FIG. 21*d*).

The basic compact element obtained has four straps or two double straps (ring 2, 3, 5, 6). These straps allow further interlinking with identical or different compact elements and with other ring-interlinked elements.

Figure 22A:
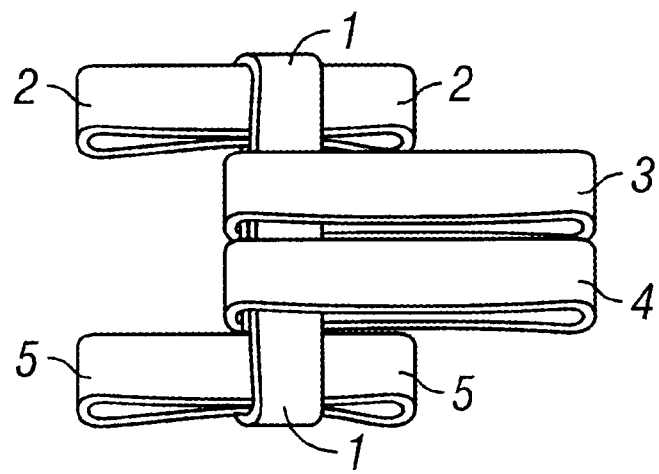
FIGS. 22a–c show a basic compact element with two double straps opposite and offset to one another and the assembly sequence.
Figure 22B:
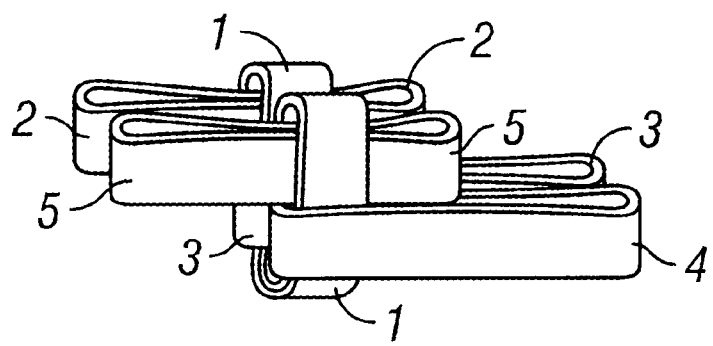
Figure 22C:
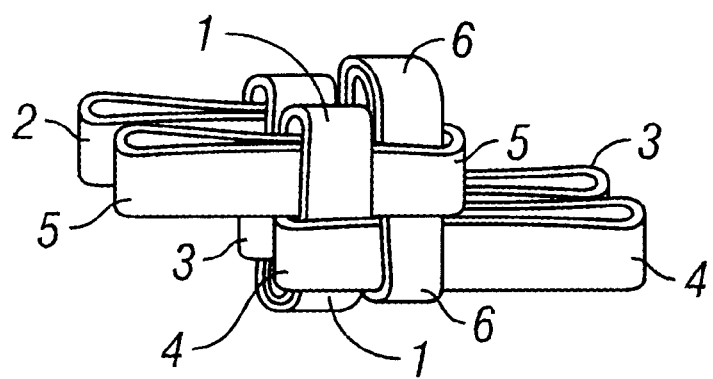
Figure 24A:
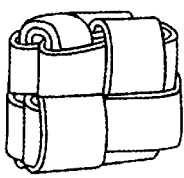
FIGS. 24a–f show compact structural elements.
Figure 24B:
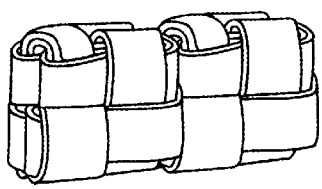
Figure 24E:
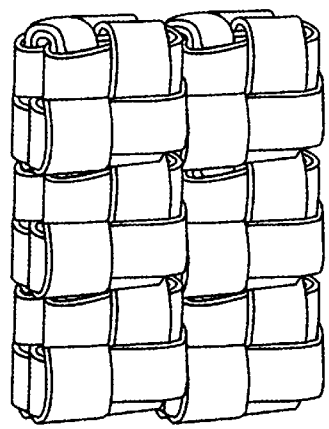
Figure 24C:
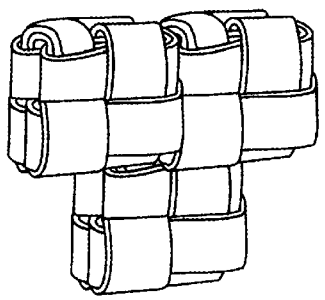
Figure 24D:
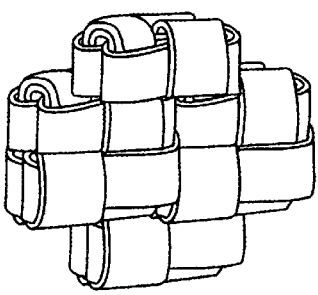
Figure 24F:
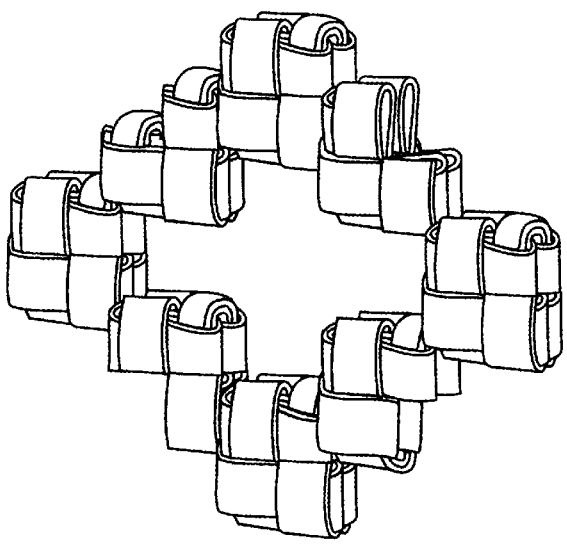
Figure 25A:
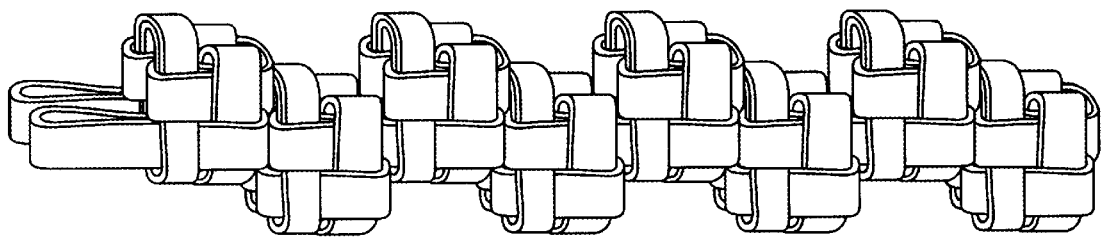
FIGS. 25a–d show bands and rings with high elasticity.
Figure 25B:
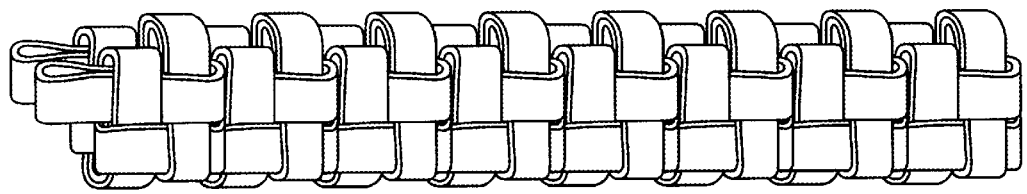
Figure 25C:
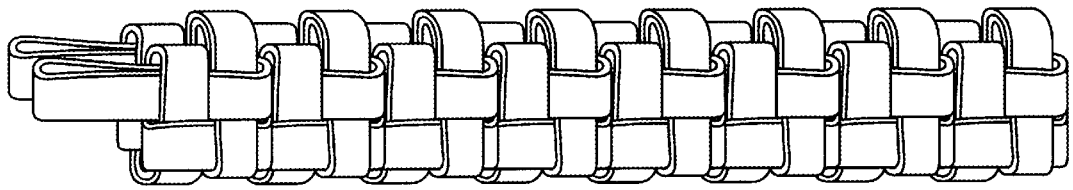
Figure 25D:
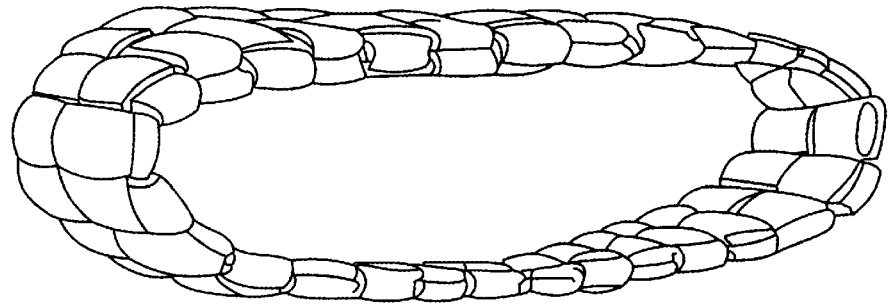

II.E. Basic Compact Element With Two Double Straps Opposite and Offset to One Another The element consists of six rings pressed together. These are interlinked as follows:
1. Ring 1 is arranged vertically.
2. Ring 2 is arranged horizontally. It is led through ring 1, so that ¼ of the length of ring 2 projects from ring 1 on the right and ¾ of the length of ring 2 projects from ring 1 on the left.
3. Ring 3 is arranged laterally parallel to ring 2 directly below the latter. It surrounds ring 1 with its left end, so that ¾ of the length of ring 3 projects from ring 1 on the right.
4. Ring 4 is arranged laterally parallel to ring 3 directly below the latter. It surrounds ring 1 with its left end, so that ¾ of the length of ring 4 projects from ring 1 on the right.
5. Ring 5 is arranged laterally parallel to ring 4 directly below the latter. It is led through ring 1, so that ¼ of the length of ring 5 projects from ring 1 on the right and ¾ of the length of ring 5 projects from ring 1 on the left (cf. FIG. 22*a*).
6. The element is then folded together along the axis between ring 3 and ring 4, so that ring 1 forms a U-shape (=U-ring 1), the legs of which point upward (cf. FIG. 22*b*).
7. U-ring 6 is arranged parallel to U-ring 1, but in such a way that the legs point downward. These are led in each case through the ends of ring 2 and ring 5 and surround in each case ring 3 and ring 4 with their lower end, so that the ends of ring 3 and ring 4 project from U-ring 6 on the right at the bottom and the ends of ring 2 and ring 5 project from U-ring 1 on the left at the top (cf. FIG. 22*c*).

The basic compact element obtained has four straps or two double straps (ring 3, 4, 2, 5). These straps allow further interlinking with identical or different compact elements and with other ring-interlinked elements.

II.F. Basic Compact Element With Three Double Straps Arranged at Right Angles to One Another This element is obtained from the interlacing of seven rings according to the interlinking technique of the area-covering mat with a rectilinear ring arrangement (cf. A.1.–7.).
1. Ring 2 is arranged vertically.
2. Ring 1 is pushed horizontally through the upper region of ring 2, so that ¼ of the length of ring 1 projects from ring 2 on the left and ¾ of the length of ring 1 projects from the latter on the right.
3. Ring 3 is arranged laterally parallel to ring 1 directly below the latter. It surrounds ring 2 with its right end, so that ¾ of the length of ring 3 projects from ring 2 on the left. Ring 3 is therefore offset to the left by ¾ of its length in relation to ring 1.
4. Ring 4 is arranged laterally parallel to ring 2, directly next to the latter on the left. It surrounds ring 3 with its lower end and is then led through the left end of ring 1. Ring 4 is therefore offset upward by ¾ of its length in relation to ring 2.
5. Ring 5 is arranged laterally parallel to ring 3 directly below the latter. It surrounds ring 2 with its right end, so that ¾ of the length of ring 5 projects from ring 2 on the left.
6. Ring 6 is arranged laterally parallel to ring 5 directly below the latter. It is led through the lower end of ring 2, so that ¼ of the length of ring 6 projects from ring 2 on the left and ¾ of the length of ring 6 projects from ring 2 on the right. Ring 6 is therefore offset to the right by ¾ of its length in relation to ring 5.
7. Ring 7 is arranged laterally parallel to ring 2, directly next to the latter on the left. It surrounds ring 5 with its upper end and is then led through the left end of ring 6, so that ¾ of the length of ring 7 projects downward below ring 6 (cf. FIG. 23*a*).

The element thus obtained is folded together along the axis between ring 3 and ring 5 and thus forms the basic compact element with three double straps arranged at right angles to one another (cf. FIG. 23*b*). The straps allow further interlinking with identical or different compact elements and with other ring-interlinked elements.

III. Product Variants From the Interlinking of Basic Compact Elements

Infinite variations of forms with a two-dimensional and three-dimensional extent can be produced from the basic compact elements. They can be connected in any desired way to one another and to other ring interlinkings, such as, for example, the mats and the modular system (mat, prism, cube) already described in the patent, without further materials having to be used for this purpose.

The accompanying drawings 24 to 26 present by way of example some products which can be produced from basic compact elements.

Figure 26A:
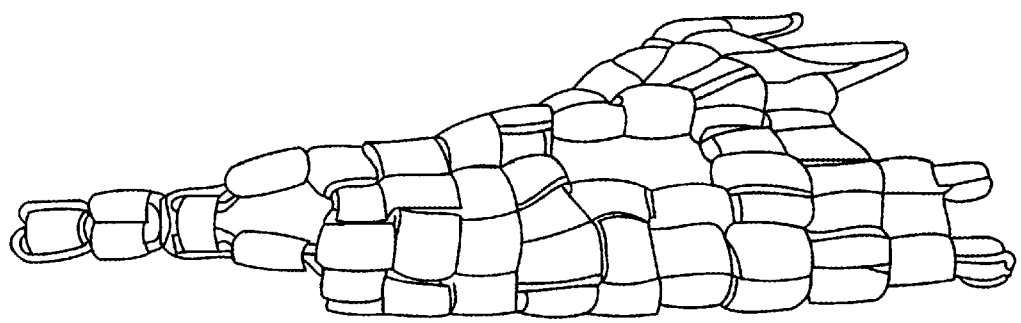
FIGS. 26a–c show hollow bodies.
Figure 26B:
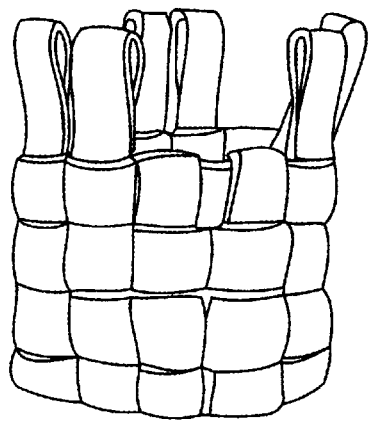
Figure 26C:
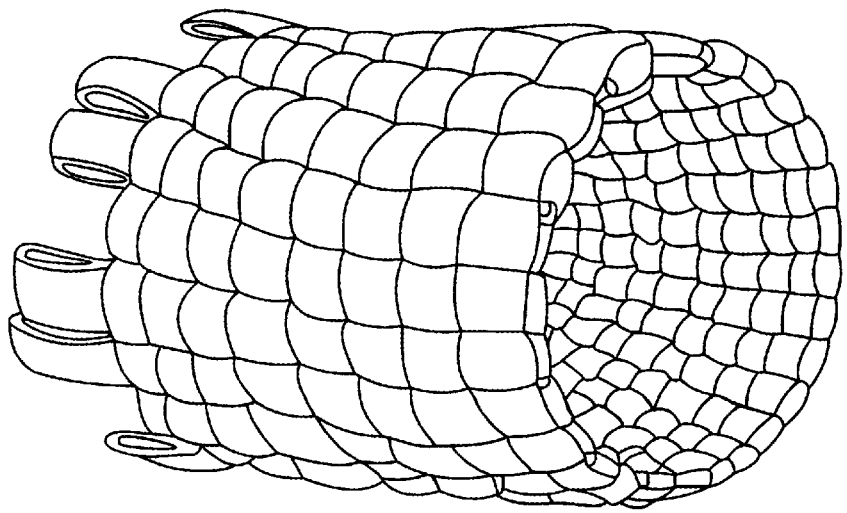
Figure 27A:
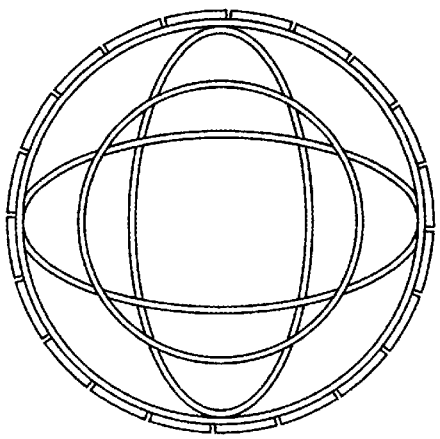
FIGS. 27a–d show a module A 1.
Figure 27B:
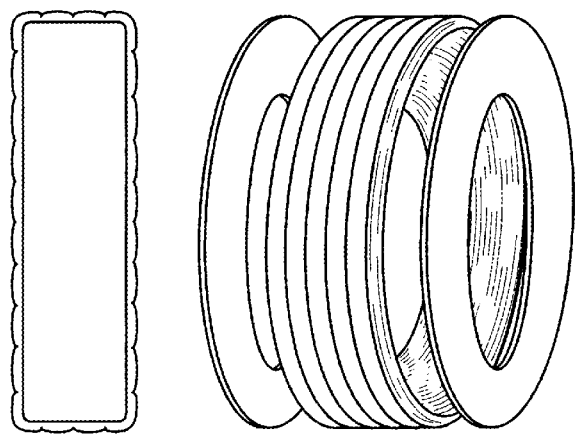
Figure 27C:
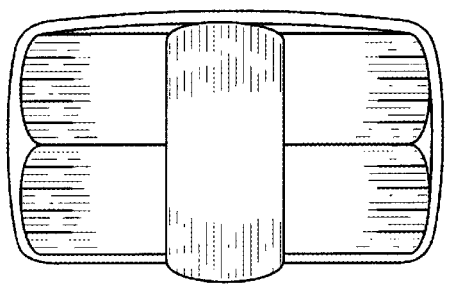
Figure 27D:
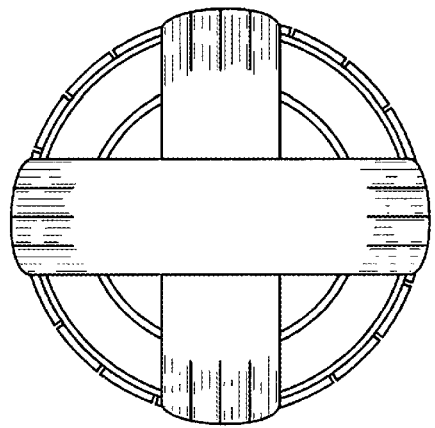

I. Compact structural elements (cf. FIGS. 24a–f)
II. Bands and rings with high elasticity (cf. FIGS. 25a–d)
III. Hollow bodies (cf. FIGS. 26a–c)

The basic compact elements presented, and also the mats illustrated, supplement the previous developments of ring-interlinked elements in an ideal way, so that, overall, a modular system with unlimited configuration possibilities is now available.

An advantageous modular design is [lacuna] below with reference to drawings 27 to 50

Module A is composed in each case of four to nine partly broken-up steel-reinforced used tires. The tires are connected solely by the use of partly broken-up tires. Different modular variants are produced by means of this assembly technique.

Module A 1

Overall, four used tires are used for module A 1 (FIGS. 27a to d). Two of these are broken up, so that two tread rings reinforced with steel fabric and four side walls reinforced by a steel ring are obtained. The two remaining tires are laid one above the other. The side walls are folded once in the middle. In each case two folded side walls are then clamped into each tire. Subsequently, the two tread rings, crossing over, are drawn over the two unbroken tires and thus ensure that the overall structure is held together.

Module A 2

Figure 28A:
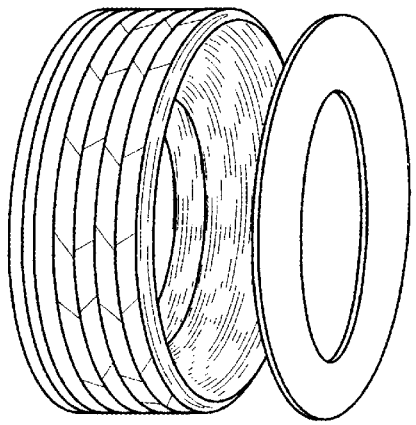
FIGS. 28a–b show a module A 2.
Figure 28B:
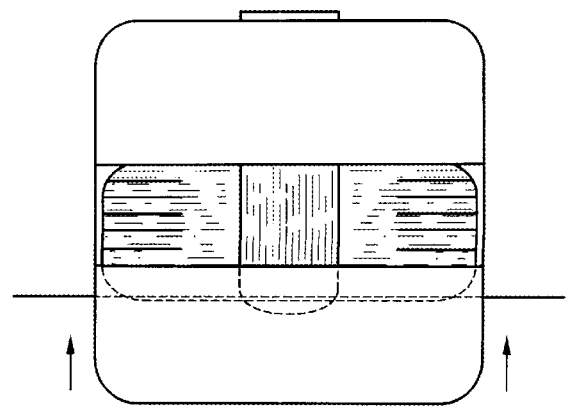

The basis for this module is module A 1 (FIGS. 28a and b). In addition, a side wall is detached from a further tire. The remaining tread ring with a side wall is overturned (inverted) and is drawn over the module from above, thus ensuring additional dimensional stability. A further variant is obtained when a tread ring with a side wall is also additionally drawn over the lower part of the module. This gives rise to a compact basic element of versatile use.

Module A 3

The starting point for this module type shown in FIGS. 29a and b is module A 2. Like all the other variants, this has a cavity which can be filled with broken-up tires. The module obtained as a result has a greater weight (35–50 kg) and greater compression resistance.

Block Formation With the Module A Variants

Figure 30B:
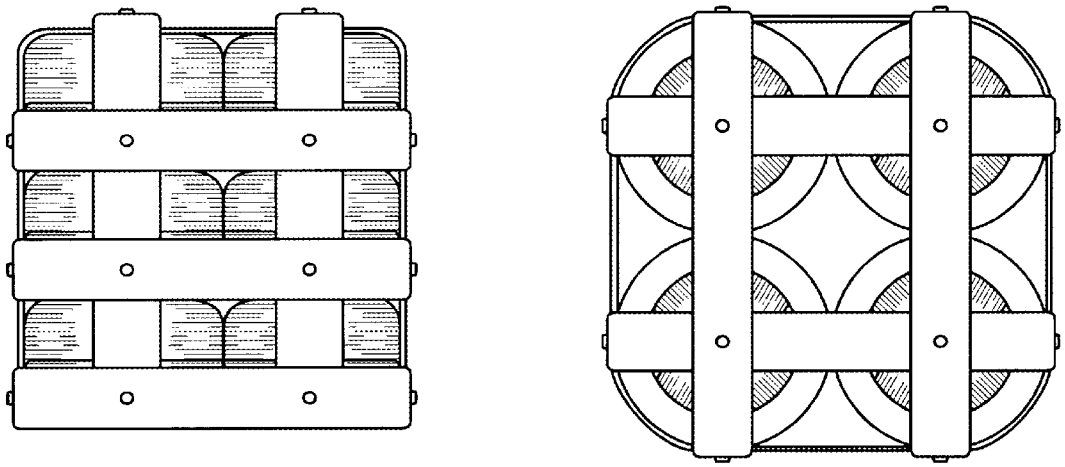
Figure 30C:
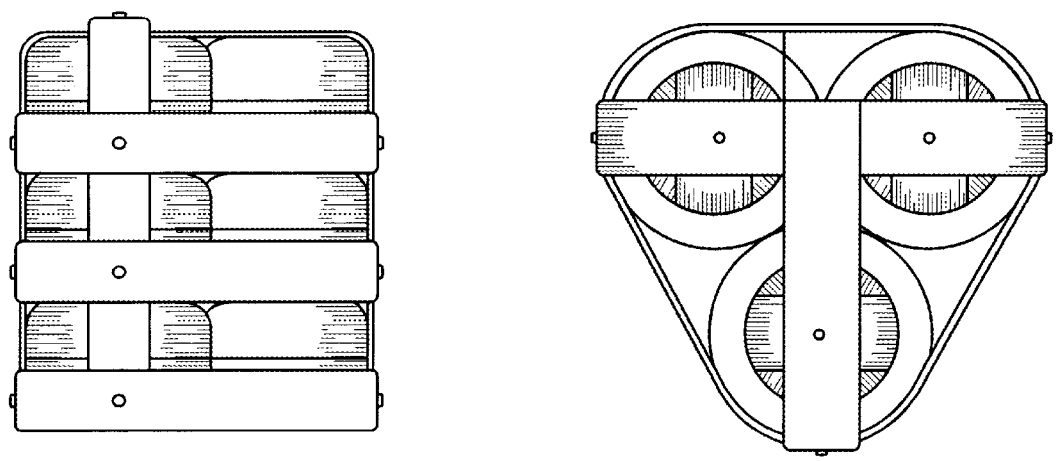
Figure 33:
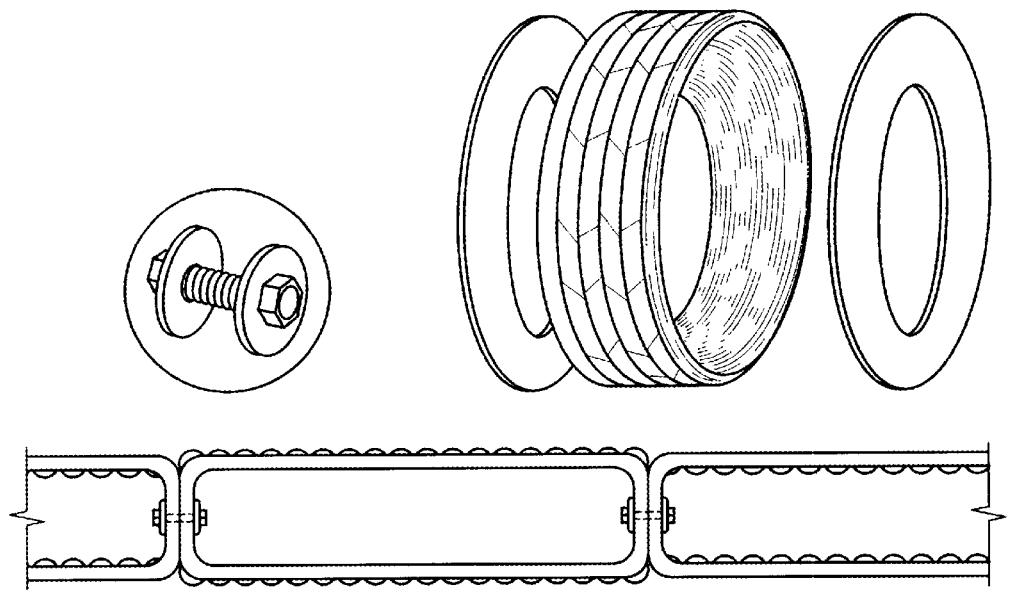
FIG. 33 shows a module C 1.

The various modules A can be varied as desired and assembled into blocks, as shown in FIGS. 30a to c. For this purpose, they are screwed together by means of steel bolts. This gives rise to blocks of different shape and size.

Module C consists of partly broken-up used tires. In this case, either the tread rings or the tread bands (cut-open tread rings) are used. The connection is made in each case by means of steel bolts or by interlacing. Four module types are thus obtained.

Module C 2

Figure 34:
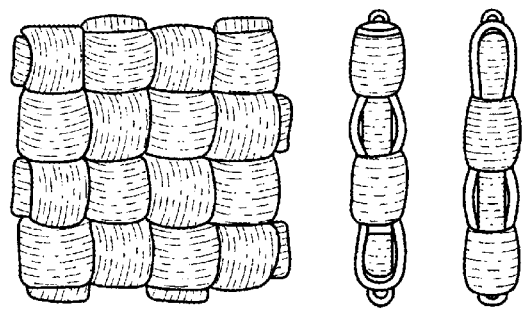
FIG. 34 shows a module C 2.
Figure 35:
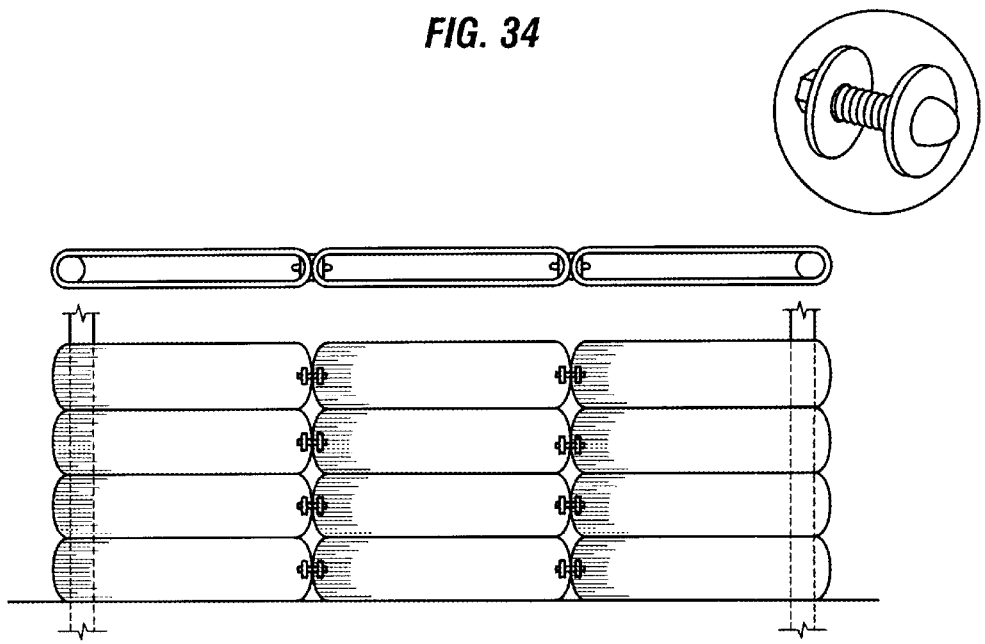
FIG. 35 shows a block formation from module C 1.

The tread rings are interlaced, as depicted in FIG. 34. Eight rings are used for a module. A four-wall interlaced structure is thus obtained. The size of the interlaced structure depends on the size of the tread rings used.

Block Formation With the Module C Variants

Block Formation From Module C 2

Figure 36:
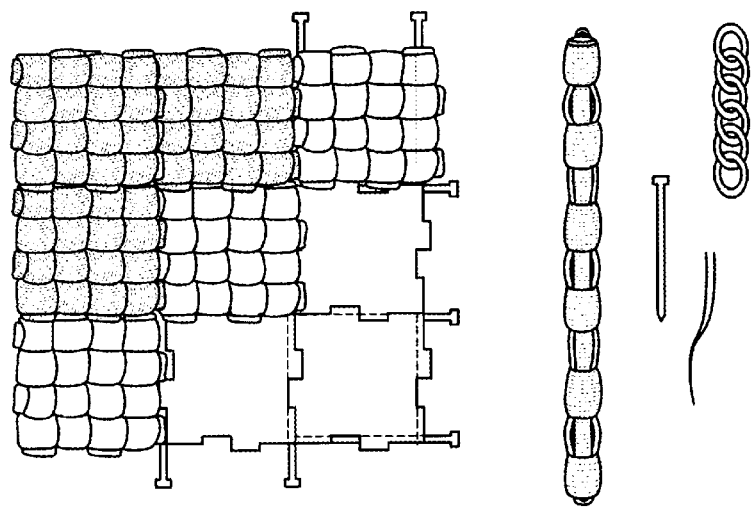
FIG. 36 shows a block formation from module C 2.
Figure 37:
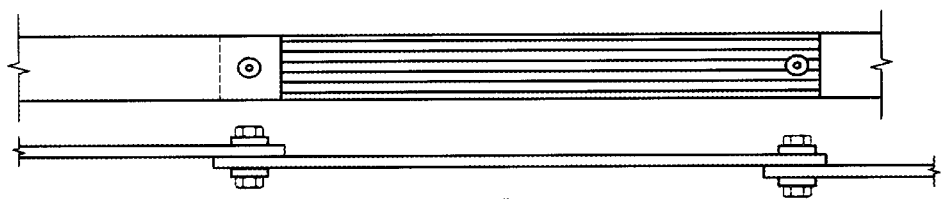
FIG. 37 shows a module C 3.

The C 2 modules in each case have straps at the ends (FIG. 36). In order to connect two modules to one another, a steel rod, a steel rope or a steel chain is pushed alternately through the straps of the two modules contiguous to one another. A stable interlaced structure of any desired area can thus be produced.

Module D consists of an odd number of used tires set up parallel to one another, such that a hollow cylinder is obtained. The tires may be connected in different ways, so that different module variants are obtained from them.

Module D 1

Figure 38A:
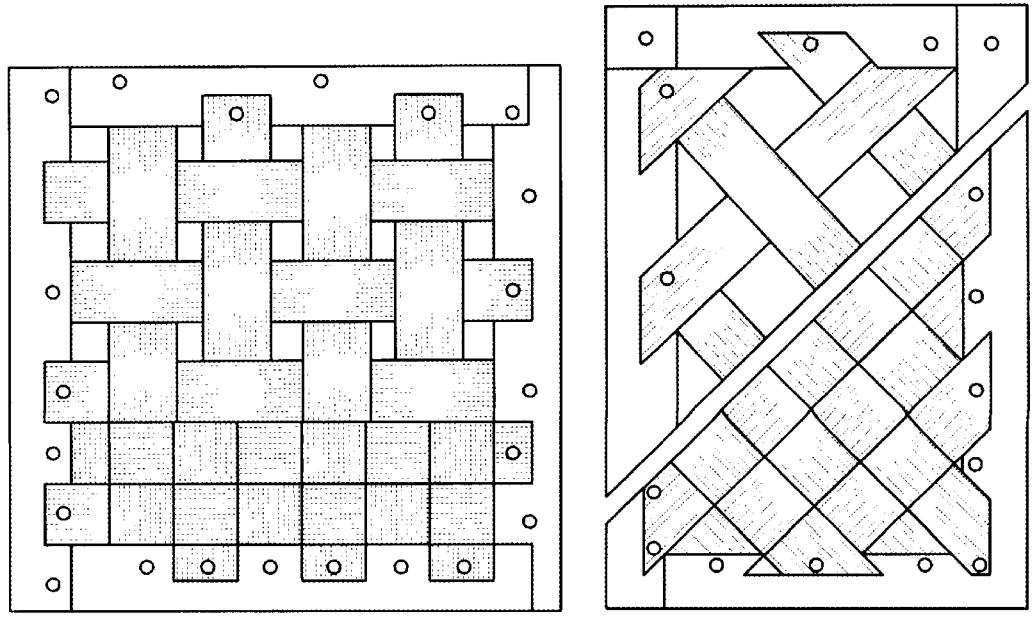
FIG. 38a shows a module C 4.
Figure 38B:
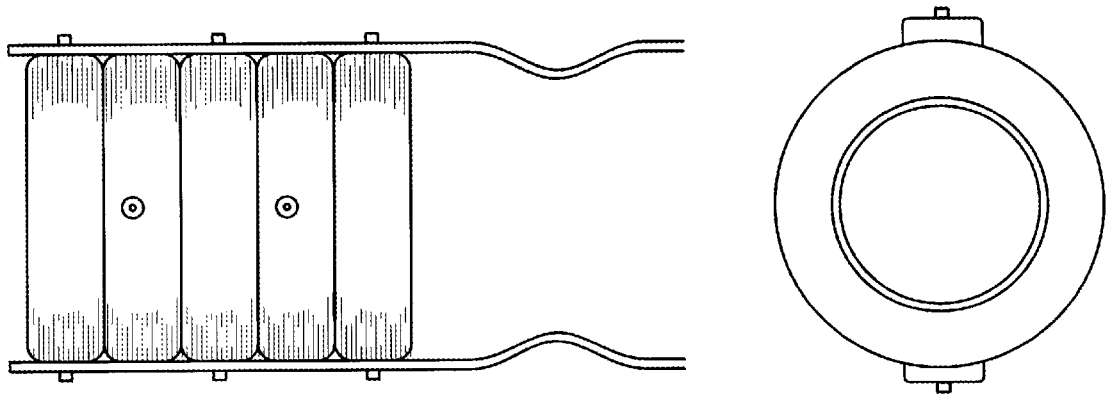
FIGS. 38b–c show a module D 1.
Figure 38C:
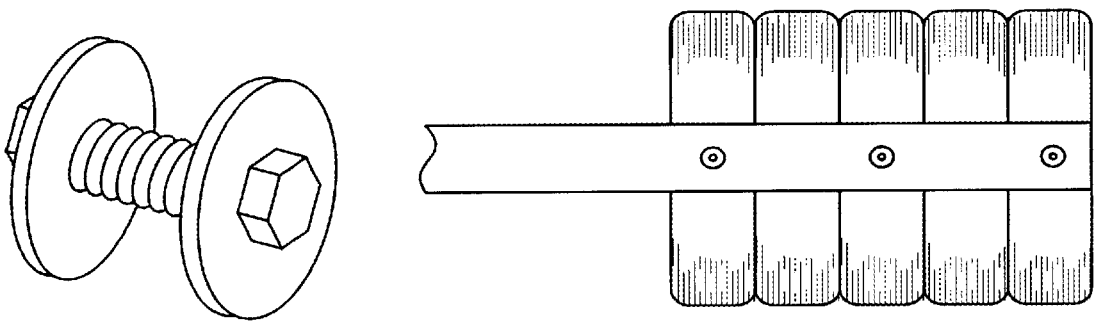

Module D 1 (FIGS. 38b and c) consists of an odd number of tires which are set up next to one another in parallel and are connected at points opposite to one another, on the outside, to two tread bands. In this case, the tread bands are firmly screwed to every second tire by means of a steel bolt. In this connection, only half the length of the tread bands is fastened to the tires, so that a residual length remains. The tread length depends on the diameter of the original tire, so that different lengths can be used here.

Block Formation With the Module D Variants

Block Formation From Module D 1

Figure 39:
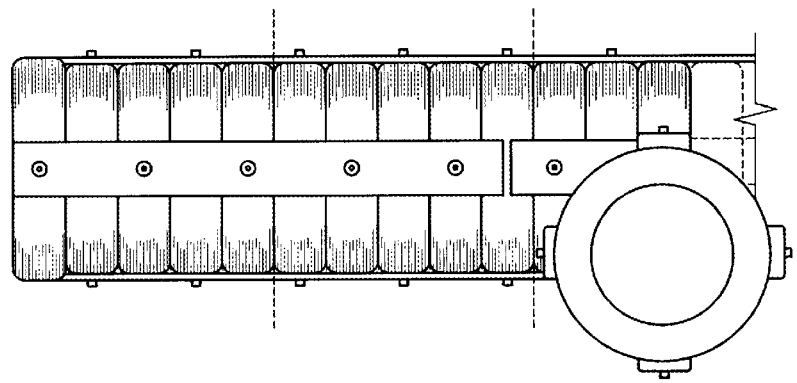
FIG. 39 shows a block formation from module D 1.

Modules D 1 can be assembled to form a tube of any desired length, as shown in FIG. 39. In this case, two modules are connected in such a way that the tread overhangs of the first module are firmly screwed to the tires of the second module by means of steel bolts. At the same time, the modules are in each case joined to one another so as to be offset at 900. All the modules are then held together in the overall structure by means of four tread bands attached at uniform intervals.

Block Formation From Module D2

Figure 40A:
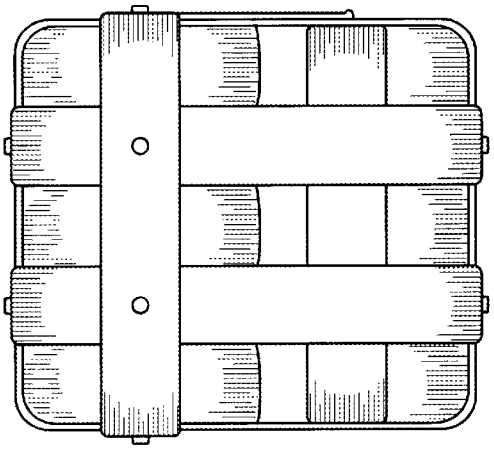
FIGS. 40a–b show a block formation from module D 2.
Figure 40B:
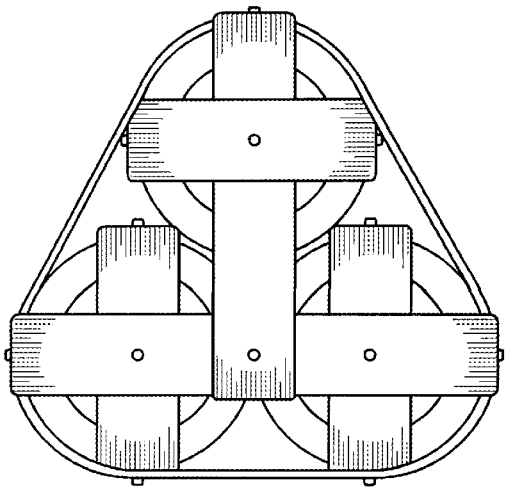

For block formation, three D 2 modules are set up next to one another in the form of a triangle (FIGS. 40a and b). The connection is made by means of a plurality of tread bands which are held together by means of steel bolts.

Module D 2

Figure 41:
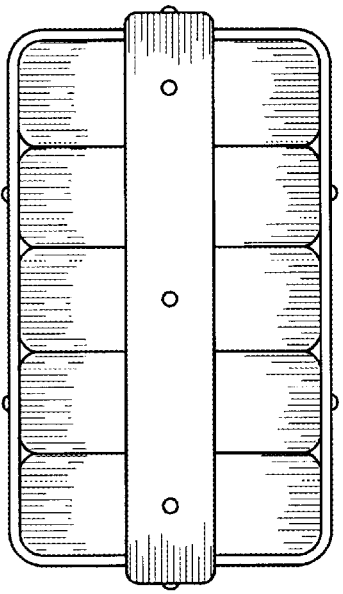
FIG. 41 shows a side view of module D 2.
Figure 42:
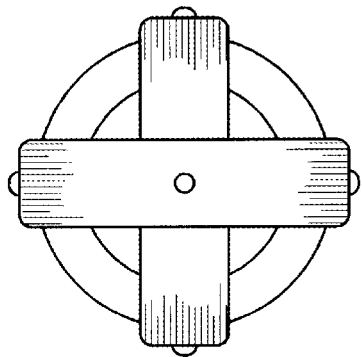
FIG. 42 shows a top view of module D 2.
Figure 43:
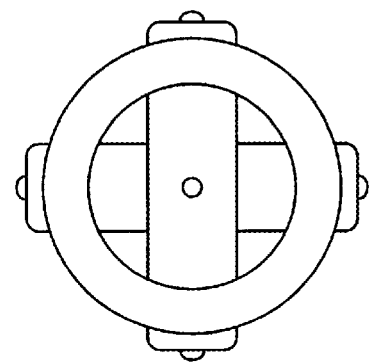
FIG. 43 shows an inner view of module D 2.

In module D 2, the tires set up next to one another in parallel are connected to four tread bands, as shown in FIGS. 41 to 43. This is carried out in a similar way to module D1. The overhanging tread bands, crossing over, are laid around the end. This gives rise to a closed-off hollow cylinder. The cavity can be filled with various materials, depending on the intended use.

Module D 3

Figure 44:
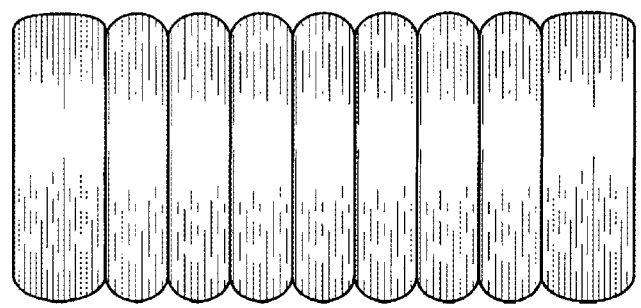
FIG. 44 shows a side view of module D 3.

Module D 3 (FIGS. 44 and 45) also consists of a number of tires set up laterally parallel to one another. In each case a tire drawn onto rims is placed at the two ends of this row of used tires.

The screw holes on the rims are sealed off. In addition, an air valve with access to the inner cavity is attached. The central rim hole is likewise sealed off by attachment of a connecting element.

A steel chain is clamped to both rims through the eyes of the connecting elements and connects the rims through the inner cavity. The tire carcasses are consequently drawn firmly up against one another, so that a sealed-off hollow cylinder is obtained. The latter is subsequently put under air pressure by means of the previously attached valve.

Block Formation From Module D 3

Modules D 3 can be assembled in various ways to form a block. The first variant gives rise to a long tubular block element. In the second variant, the modules are joined to one another in parallel, so that a large-area block element is obtained.

1st Variant

Two modules D 3 are set up rim to rim one behind the other (FIGS. 46 and 47). A tire carcass is inserted between them. An orifice is cut into the tread of this carcass, in order to allow access to the connecting rings on each of the two rims. The two connecting rings are connected to one another by means of a steel rope or a steel chain. The modules and the tire carcass located between them are thereby connected to form a unit. This process may be repeated, so that a tubular block element of any desired length can be produced.

2nd Variant

Figure 48:
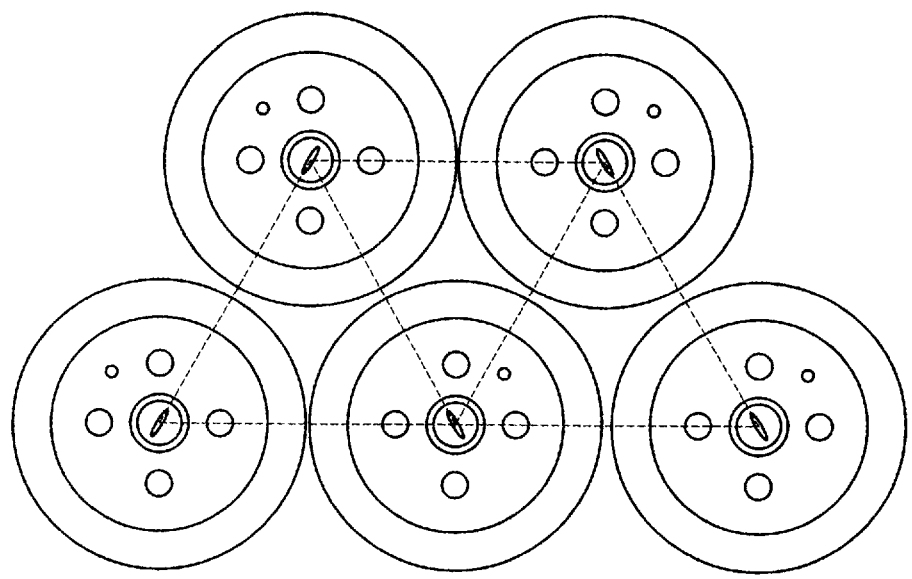
FIG. 48 shows a cross section through the second variant of the block formation from module D 3.
Figure 49:
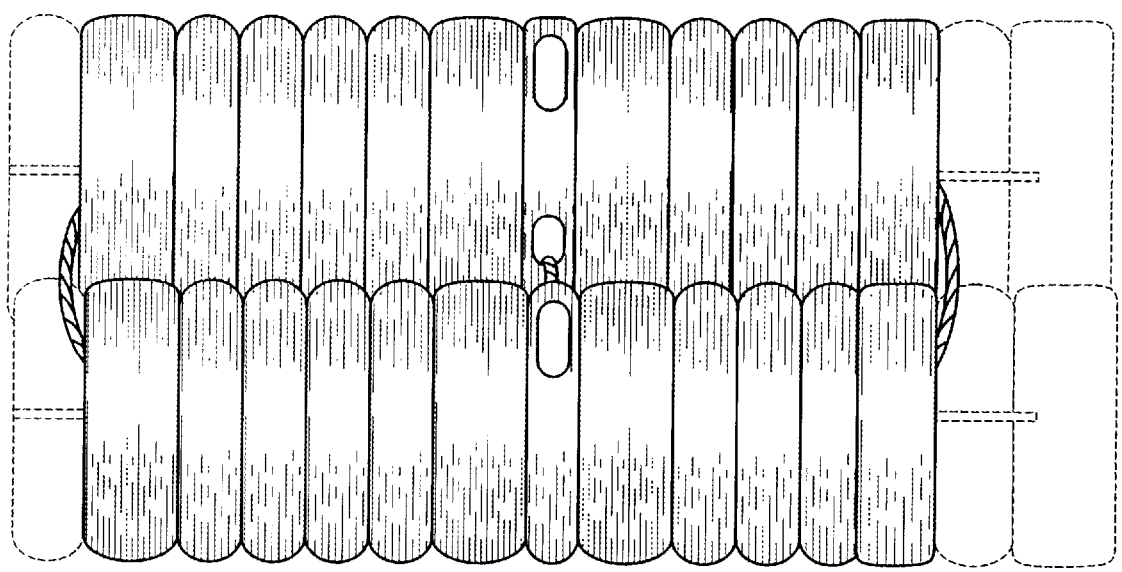
FIG. 49 shows a top view of the second variant of the block formation from module D 3.

Module D 3 units are set up parallel to one another (FIGS. 48 and 49). The connection is made in any desired configuration by means of steel chains which are drawn through the connecting rings.

The block elements of the first variant may also be assembled in a similar way to form a large-area article.

Block Formation From Module C 4

Figure 50:
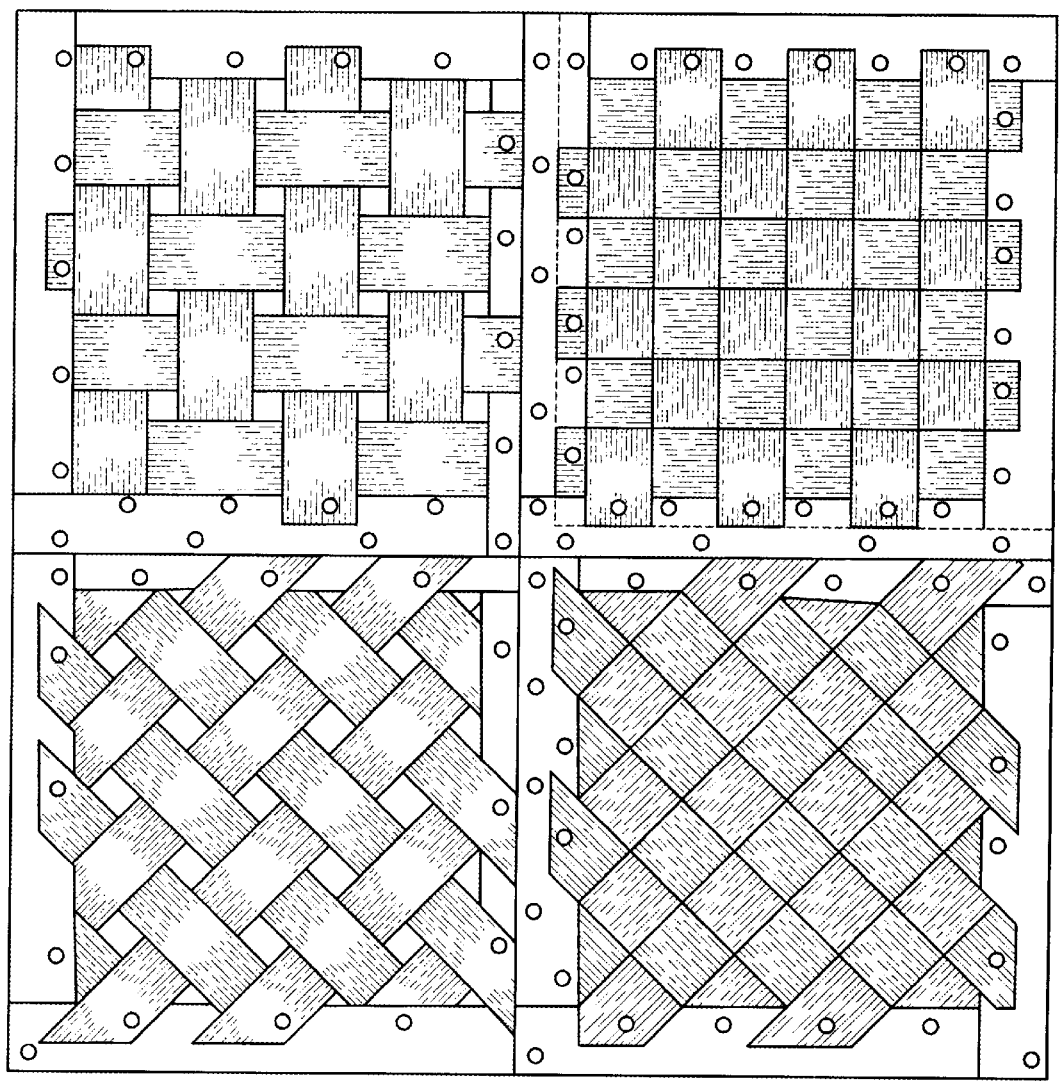
FIG. 50 shows a block formation from module C 4.

C 4 modules are laid one above the other at the edges over half a tread width and are connected by means of steel bolts or rivets (FIG. 50). Any desired widening in area in any direction thus becomes possible.

All mat types can, in principle, be connected to one another, in order to produce areas of any desired size. In this case, individual mat types are connected to one another by means of additional ring bands in a similar way to the interlinking technique specific to mats. The mat types may be interlinked to form a hose, in that two opposite ends of a mat are joined to one another and are connected to additional rings. The circumference of the hose-like hollow body corresponds to the mat width. This may in each case be widened or reduced by the amount of the diameter of a ring. There is also the possibility of varying the circumference of the hose in smaller units, in that the interlinking line is not laid rectilinearly, but helically, that is to say the mat ends are assembled so as to be offset obliquely. The hose ends have a conical shape in this connection technique.

Innovative Recycling Products

Numerous products, to produce which only used tires and some connecting elements are required, were developed from the modules and blocks described above.

It is already clear that, in addition to the product developments mentioned, there are numerous other areas of application for the invention described, so that the product range is constantly expanded.

An overview is given below:

| Product | Modules or blocks | Assembly parts additionally required |
|---|---|---|
| Noise protection wall | | Steel posts, bolts or rivets |
| Flexible tube | Block D1 and module C3 | Steel bolts |
| Floating platform | Block D2 and A2, module C3 | Steel bolts or rivets |
| Flood mats | Block C2 | Steel rods, steel rope or steel chain, tie claws |
| Flood rampart | Block D3 | Steel chain, air valve, rims and steel bolts |
| Sight screen | Block C4 | Steel bolts |
| Rubber rolling conveyor | Module C3, block A3 and C4 | Steel bolts or rivets |

-continued

| Product | Modules or blocks | Assembly parts additionally required |
|---|---|---|
| Climbing tower/scaffold | | Steel bolts or rivets |
| Rubber labyrinth | | Steel bolts or rivets, steel posts, steel tubes |
| Seat element | Module A3 | |

The innovation described here involves the assembly technique which allows further utilization of used tires. In terms of the priorities laid down by law for recycling (see Table), an important gap in the staged utilization of used tires is closed in this way.

| Priorities set for an environmental safe utilization of waste products by the example of a tire | |
|---|---|
| 1. Avoidance: | There is still no replacement for the tire<br>The tire has a restricted service life<br>The potential for avoidance is low |
| 2. Reuse: | Remolded tires, export |
| 3. Further use: unbroken | Hitherto: no applications on the market[1]<br>Now: innovative recycling products |
| 4. Reutilization: broken up | Hot/cold granulation and rubber flour, e.g. asphalt additive, insulating material |
| 5. Reutilization: chemical treatment | Pyrolysis, hydration, thermal depolymerization for the recovery of organic raw materials |
| 6. Reutilization: thermal | Combustion, e.g. in the cement industry and in power stations |

The products manufactured from used tires have substantial advantages (see Table), as compared with commercially available competitive products, due to the use of a waste product, because of the material properties of tires and on account of modular prefabrication.

Two completely novel product ideas for high-water protection have also been developed through the application of the technology described above. At our level of knowledge, there is still no comparable development for this area of application on the market. These are a flood rampart and a flood mat.

| Advantages of the IRP products, as compared with the competitive products on the market | |
|---|---|
| Noise protection wall | Recycling principles implemented<br>Low overall costs<br>Rapid and simple assembly<br>Long service life<br>Maintenance-free<br>Flexible adaptation to the land<br>Outstanding noise protection properties |
| Flexible tube | Recycling principles implemented<br>Low overall costs<br>Simple construction technique<br>Variable adaptation to the land<br>Independence from heavy building machines<br>Material obtainable everywhere |

-continued

| Advantages of the IRP products, as compared with the competitive products on the market | |
| --- | --- |
| Floating platform | Recycling principles implemented<br>Low overall costs<br>Long service life<br>Maintenance-free<br>Variable configuration and rearrangement possible<br>Weather resistance<br>Material and design-related flexibility |
| Sight screen | Recycling principles implemented<br>Low overall costs<br>Variable configuration<br>Simple and rapid assembly |
| Rubber rolling track for skateboards and inline skaters | Recycling principles implemented<br>Low overall costs<br>Maintenance-free<br>Soft material properties increase safety<br>Unlimited configuration possible |
| Rubber labyrinths | Recycling principles implemented<br>Low overall costs<br>Variety of configuration<br>Variability in horizontal projection |
| Climbing frame | Low overall costs<br>Safety on account of soft material properties<br>Variety of configurations |
| Seat element for open country | Recycling principles implemented<br>Low overall costs<br>Simple production<br>Weather-resistant<br>Maintenance-free |

What is claimed is:

1. An element (10) composed of a plurality of horizontally and vertically running strips (12 to 26) which have common intersection points, strips (12 to 26) being in each case closed rings (28), and in each case a ring (28) alternately surrounding the rings (28) arranged at right angles to it or being led through these rings(28), in each case a front end (36) of a ring (28) being led in each case through a rear end (38) of a ring (28) arranged at right angles to it, wherein the element (10) is a closed body with a square base area and a square basic element, ends (36; 38) projecting beyond the side edges (40) of rings (28) arranged at right angles to said ends, in such a way that eyes (42) or loops for mounting further elements or connecting elements (34) are obtained, so that the square basic elements can be joined to one another.

2. The element (10) as claimed in claim 1, wherein the rings (28) in each case consist of elastic material.

3. The element (10) as claimed in claim 1, wherein the rings (28) in each case consist of the tread (30) of a vehicle tire (32).

4. The element (10) as claimed in claim 3, wherein the connecting elements (34) capable of being fed through the eyes (42) of the element (10) are rods (46; 54), chains (44; 56), ropes, or tubes (62).

5. The element (10) as claimed in claim 1, wherein the element (10) is capable of being connected to five further identical elements (10) to form a cube (64).

6. The element (10) as claimed in claim 5, wherein a bag (70) fillable with water, with air or with a solid material is capable of being introduced in the cube (64).

7. The element (10) as claimed in claim 1, wherein the element (10) is capable of being connected to two further identical elements (10) to form a triangle.

8. The element (10) as claimed in claim 1, wherein the element (10) is capable of being connected to a claw tie (74).

9. The use of an element (10) as claimed in claim 1, for flood protection purposes.

10. The use of an element (10) as claimed in claim 1 for a noise protection wall.

11. A use of an element (10) as claimed in claims 1 as an impact protection element.

12. The method for production of elements (10) by the interlinking of closed rings (28), the rings (28) being connected to form an element (10), in such a way that in each case a ring (28) alternately surrounds the rings (28) arranged at right angles to it or is led through these rings (28), in each case a front end (36) of a ring (28) being led in each case through a rear end (38) of a ring (28) arranged at right angles to it, wherein the elements in each case form closed bodies with a square base area and a front and rear end (36; 38) respectively projects beyond the side edge (40) of a ring (28) arranged at right angles to said end, in such a way that an eye (42) for mounting a connecting element (34) or further elements (10) is obtained.

13. The method as claimed in claim 12, wherein, for the production of rings (28), in the case of a number of motor vehicle tires (32) corresponding to the number of rings (28) of the element (10), the side walls (94) and rubber-encased rim rings (45) of said tires are detached, and wherein the remaining tread rings are used as rings (28).

14. An element (10) composed of a plurality of horizontally and vertically running strips (12 to 26) which have common intersection points, strips (12 to 26) being in each case closed rings (28), and in each case a ring (28) alternately surrounding the rings (28) arranged at right angles to it or being led through these rings(28), in each case a front end (36) of a ring (28) being led in each case through a rear end (38) of a ring (28) arranged at right angles to it, wherein the element (10) is a closed body with a square base area and a square basic element, ends (36; 38) projecting beyond the side edges (40) of rings (28) arranged at right angles to said ends, in such a way that eyes (42) or loops for mounting further elements or connecting elements (34) are obtained, so that the square basic elements can be joined to one another, and wherein said rings comprise tires, geotextiles, plastic casks or sheet-metal rings.

15. A method for production of elements (10) by the interlinking of closed rings (28), the rings (28) being connected to form an element (10), in such a way that in each case a ring (28) alternately surrounds the rings (28) arranged at right angles to it or is led through these rings (28), in each case a front end (36) of a ring (28) being led in each case through a rear end (38) of a ring (28) arranged at right angles to it, wherein the elements in each case form closed bodies with a square base area and a front and rear end (36; 38) respectively projects beyond the side edge (40) of a ring (28) arranged at right angles to said end, in such a way that an eye (42) for mounting a connecting element (34) or further elements (10) is obtained, and wherein said rings comprise tires, geotextiles, plastic casks or sheet-metal rings.

* * * * *